United States Patent
Asahi et al.

(10) Patent No.: US 11,205,936 B2
(45) Date of Patent: Dec. 21, 2021

(54) BUS BAR UNIT AND MOTOR INCLUDING THE SAME

(71) Applicant: Nidec Corporation, Kyoto (JP)

(72) Inventors: Yu Asahi, Kyoto (JP); Takao Atarashi, Kyoto (JP); Masayoshi Maeda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 158 days.

(21) Appl. No.: 16/487,204

(22) PCT Filed: Jan. 30, 2018

(86) PCT No.: PCT/JP2018/002868
§ 371 (c)(1),
(2) Date: Aug. 20, 2019

(87) PCT Pub. No.: WO2018/179790
PCT Pub. Date: Oct. 4, 2018

(65) Prior Publication Data
US 2020/0014272 A1 Jan. 9, 2020

(30) Foreign Application Priority Data

Mar. 31, 2017 (JP) .............................. JP2017-072680

(51) Int. Cl.
*H02K 5/22* (2006.01)
*H02K 3/52* (2006.01)
*H02K 11/25* (2016.01)

(52) U.S. Cl.
CPC ............... *H02K 5/225* (2013.01); *H02K 3/52* (2013.01); *H02K 3/522* (2013.01); *H02K 5/22* (2013.01);
(Continued)

(58) Field of Classification Search
CPC .... H02K 3/522; H02K 11/25; H02K 2203/09; H02K 3/50; H02K 3/52; H02K 5/225;
(Continued)

(56) References Cited

U.S. PATENT DOCUMENTS 6,153,954 A * 11/2000 Uchida .................. H02K 11/25
310/68 C
2008/0242124 A1* 10/2008 Otsuji .................. H01R 25/168
439/76.2
(Continued)

FOREIGN PATENT DOCUMENTS

JP 09-312948 A 12/1997
JP 2010-119238 A 5/2010
(Continued)

OTHER PUBLICATIONS

Sakiyama Takahiro, Bus Bar Unit and Brushless Motor, May 23, 2013, Mitsuba Corp, JP 2013102596 (English Machine Translation) (Year: 2013).*

(Continued)

*Primary Examiner* — Quyen P Leung
*Assistant Examiner* — Alexander A Singh
(74) *Attorney, Agent, or Firm* — Keating & Bennett

(57) ABSTRACT

A phase bus bar unit includes a bus bar holder that is an insulator and supports of bus bars for phases of a motor rotating about a central axis, and a bus bar cover which is an insulator, covers at least one side of each of the bus bars in an axial direction, and is fixed to the bus bar holder. Each of the bus bars includes a base, extensions each extending outward in a radial direction from the base, and a terminal installed on an outer end of each of the extensions in the radial direction. The bus bar cover includes protrusions each protruding to another side in the axial direction, and the protrusions are in contact with each of the bus bars while at (Continued)

least one of the protrusions is in contact with the base at or adjacent to the extension.

14 Claims, 14 Drawing Sheets

(52) U.S. Cl.
CPC ......... *H02K 11/25* (2016.01); *H02K 2203/09* (2013.01)

(58) Field of Classification Search
CPC .. H02K 3/46; H02K 3/18; H02K 1/04; H02K 3/28; H02K 5/22; H02K 3/38
USPC .................................................. 310/71, 68 C
See application file for complete search history.

(56) References Cited

U.S. PATENT DOCUMENTS

| | | | | |
|---|---|---|---|---|
| 2013/0069461 A1* | 3/2013 | Arai | ........................ | H02K 3/522 310/71 |
| 2014/0028127 A1* | 1/2014 | Chamberlin | ........... | H02K 5/225 310/71 |
| 2015/0137637 A1* | 5/2015 | Jang | ..................... | H02K 15/095 310/71 |
| 2017/0149299 A1* | 5/2017 | Sakamoto | .......... | H02K 15/0068 |

FOREIGN PATENT DOCUMENTS

| | | | | |
|---|---|---|---|---|
| JP | 2010119238 A | * | 5/2010 | |
| JP | 2013-102596 A | | 5/2013 | |
| JP | 2013102596 A | * | 5/2013 | |
| JP | 2015-100267 A | | 5/2015 | |
| JP | 2015100267 A | * | 5/2015 | |
| JP | 2016-028542 A | | 2/2016 | |

OTHER PUBLICATIONS

Okamoto et al., Power Distributing Member for Winding, May 27, 2010, Sumitomo Wiring Syst. Ltd., JP 2010119238 (English Machine Translation) (Year: 2010).*
Sakamoto Shu, Bus Bar Unit, May 28, 2015, Kayaba Ind Co Ltd, JP 2015100267 (English Machine Translation) (Year: 2015).*
Official Communication issued in International Patent Application No. PCT/JP2018/002868, dated Mar. 27, 2018.

* cited by examiner

BUS BAR UNIT AND MOTOR INCLUDING THE SAME

CROSS REFERENCE TO RELATED APPLICATIONS

This is a U.S. national stage of PCT Application No. PCT/JP2018/002868, filed on Jan. 30, 2018, and priority under 35 U.S.C. § 119(a) and 35 U.S.C. § 365(b) is claimed from Japanese Application No. 2017-072680, filed Mar. 31, 2017, the entire disclosures of each application are hereby incorporated herein by reference.

1. FIELD OF THE INVENTION

The present disclosure relates to a bus bar unit and a motor including the same.

2. BACKGROUND

A conventional motor is disclosed in a related art. The motor includes a stator and a rotor. The stator includes an annular stator core centered on a vertically extending central axis. A plurality of teeth extending in a radial direction with respect to the central axis are formed on an inner side of the stator core in the radial direction. A coil is formed by winding a metal wire around the tooth. The rotor includes permanent magnets arranged to face the stator in the radial direction and rotates about the central axis.

Further, a wiring member is provided on an upper side of the coil in an axial direction. The wiring member includes a body part and a lid body. The body part includes a plurality of grooves, and the wire withdrawn from the coil is inserted into the groove. The lid body is fixed to the body part so as to cover the groove of the body part. In addition, the lid body includes a pressing protrusion that presses the wire inserted into the groove of the body part. The pressing protrusion is formed to protrude from a surface of the lid body on the body part side in accordance with the position of the groove of the body part. The wire inserted into the groove of the body part is pressed and fixed by the pressing protrusion.

A conventional motor includes a bus bar unit. The bus bar unit includes a bus bar base and a plurality of bus bars. The bus bar base includes a plurality of annular grooves extending in a circumferential direction with respect to a central axis of the motor, and the plurality of annular grooves are arranged in a radial direction. The plurality of bus bars are disposed in the annular grooves of the bus bar base. A coil connection part protruding outward in the radial direction of the bus bar base and each of phase terminals protruding upward in an axial direction are installed on the bus bar. Coils of a stator of the motor are connected to the coil connection part, and an external wire is connected to each of the phase terminals.

SUMMARY

However, when a lid body of a wiring member of a related art is used for a bus bar unit of a related art, some in the vicinity of a coil connection part and each of phase terminals in a bus bar may be lifted depending on the position in which a pressing protrusion of a lid body is in contact with each bus bar, so that there is a possibility that the coil connection part and each phase terminal are rattled. Thus, there is a problem that the connection between the coil connection part and the coil and the connection between each phase terminal and an external wiring become defective, and thus the reliability of the bus bar unit is lowered.

One aspect of an example embodiment of the present disclosure provides a bus bar unit including a bus bar holder which is an insulator and supports a plurality of bus bars for phases of a motor rotating about a central axis, and a bus bar cover which is an insulator, covers at least one side of each of the bus bars in an axial direction, and is fixed to the bus bar holder, wherein each of the bus bars includes a base, a plurality of extensions each extending outward in a radial direction from the base, and a terminal installed on an outer end of each of the extensions in the radial direction, the bus bar cover includes a plurality of protrusions each protruding to another side in the axial direction, and the plurality of protrusions are in contact with each of the bus bars while at least one of the protrusions is in contact with the base at or adjacent to the extension.

Another aspect of an example embodiment of the present disclosure provides a motor including the bus bar unit having configurations described above, a stator, and a rotor including a magnet facing the stator in a radial direction and rotatable about the central axis.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described in detail with reference to the drawings. Further, in the present specification, in a motor 1, a direction parallel to a central axis C of the motor 1 is referred to as an "axial direction", a direction orthogonal to the central axis C is referred to as a "radial direction", and a direction along an arc about the central axis C is referred to as a "circumferential direction". In addition, in the present specification, the term "parallel direction" also includes a substantially parallel direction. Also, in the present specification, the term "orthogonal direction" also includes a direction substantially orthogonal to each other.

Further, in the motor 1, there is a case in which the shape and the positional relationship of each part are described assuming that the axial direction is a vertical direction and a neutral point bus bar unit 23 side with respect to a stator 22 is upward. The vertical direction is merely a name used for describing and does not limit the actual positional relationship and direction.

Figure 1:
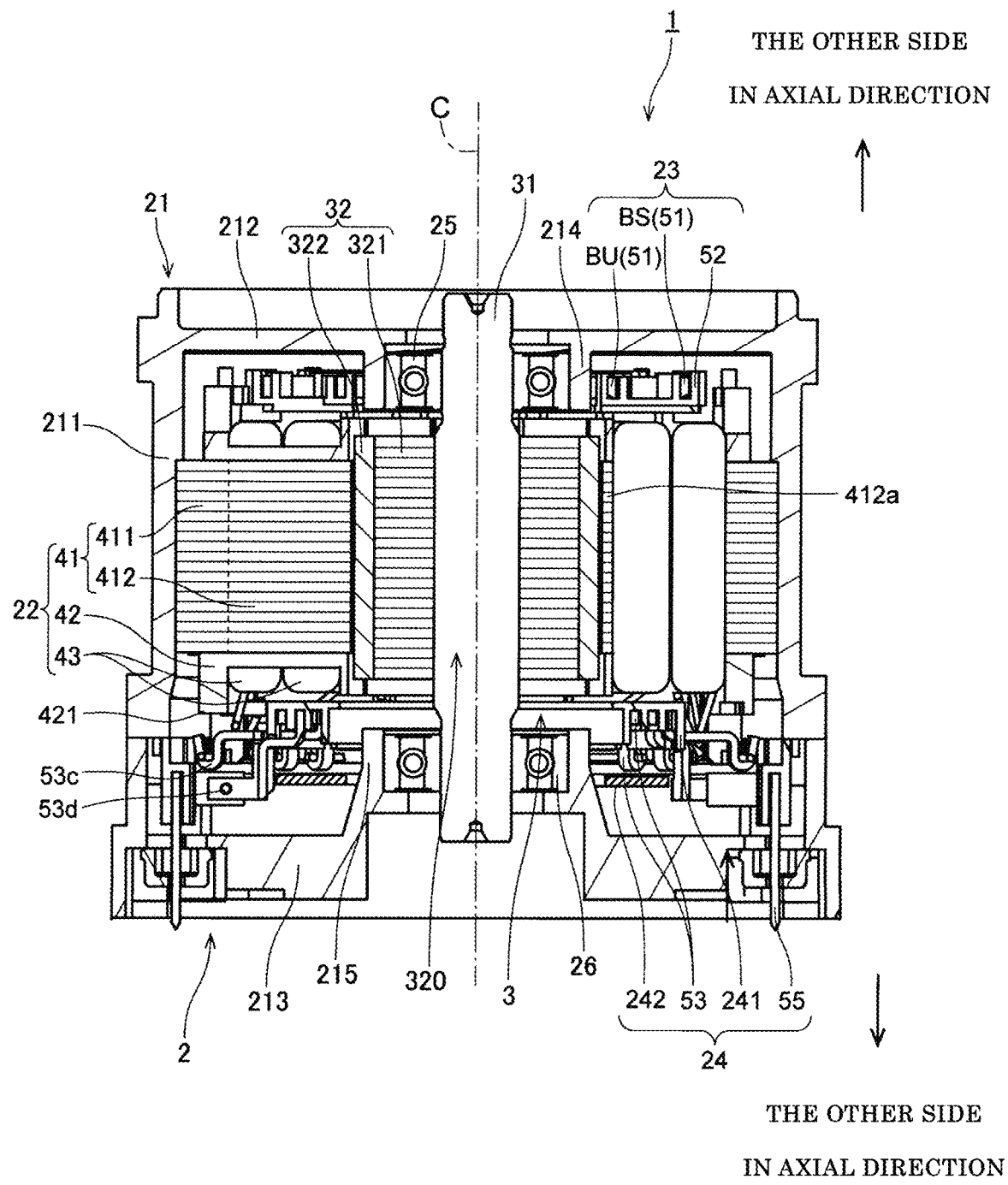
FIG. 1 is a side cross-sectional view of a motor according to an example embodiment of the present disclosure.

FIG. 1 is a side cross-sectional view of a motor according to an example embodiment of the present disclosure. A motor 1 of the present example embodiment is mounted, for example, on an automobile and is used to generate a driving power of power steering. The motor 1 may also be used for applications other than the power steering. For example, the motor 1 may be used as a driving source of other parts of the automobile, such as an engine cooling fan or oil pump. Further, the motor 1 may be mounted on a home appliance, an OA device, a medical device, or the like to generate various driving power.

The motor 1 includes a stationary part 2 and a rotating part 3. The stationary part 2 is fixed to a frame of a device to be driven. The rotating part 3 is rotatably supported about a central axis C extending in a vertical direction with respect to the stationary part 2.

The stationary part 2 includes a housing 21, a stator 22, a neutral point bus bar unit 23, a phase bus bar unit 24 (bus bar unit), a first bearing 25, and a second bearing 26.

The housing 21 includes a cylinder part 211, a first lid 212, and a second lid 213. The cylinder part 211 extends in a substantially cylindrical shape in an axial direction. The cylinder part 211 accommodates the stator 22 and a rotor 32, to be described below, on an inner side in a radial direction. The second lid 213 expands toward the inner side of the cylinder part 211 in the radial direction on one side (lower side in FIG. 1) in the axial direction with respect to the stator 22. The first lid 212 expands toward the inner side of the cylinder part 211 in the radial direction on the other side (upper side in FIG. 1) in the axial direction with respect to the stator 22 and the neutral point bus bar unit 23. In addition, the first lid 212 and the second lid 213 may include flanges (not shown) expanding outward in the radial direction from the cylinder part 211.

The cylinder part 211, the first lid 212, and the second lid 213 are made of, for example, metal such as aluminum or stainless steel. In the present example embodiment, the cylinder part 211 and the first lid 212 are constituted by a single member, and the second lid 213 is constituted by another member. However, the cylinder part 211 and the second lid 213 may be constituted by a single member, and the first lid 212 may be constituted by another member. Also, the cylinder part 211, the first lid 212, and the second lid 213 may be constituted by different members.

The stator 22 is an electric armature disposed on an outer side of the rotor 32 to be described below, in the radial direction. The stator 22 includes a stator core 41, an insulator 42, and a plurality of coils 43.

The stator core 41 is composed of laminated steel plates in which electromagnetic steel plates are laminated in the axial direction. The stator core 41 includes a core back 411 having a ring shape and the central axis C as a center thereof, and a plurality of teeth 412 each extending inward in the radial direction from the core back 411. The core back 411 is disposed substantially coaxial with the central axis C. An outer circumferential surface of the core back 411 is fixed to an inner circumferential surface of the cylinder part 211 of the housing 21. The plurality of teeth 412 are arranged at substantially equal intervals in the circumferential direction, and radially extend about the central axis C. Each of the teeth 412 includes an umbrella part 412a that protrudes in the circumferential direction from an inner end in the radial direction. Although nine teeth 412 are installed in the present example embodiment, the number of teeth 412 may be plural.

The insulator 42 is made of a resin, which is an insulator, and covers both end surfaces of each tooth 412 in the axial direction and both end surfaces of each tooth 412 in the circumferential direction. The coil 43 is constituted by a conducting wire wound around the insulator 42. That is, the insulator 42 may prevent a short circuit between the tooth 412 and the coil 43 by being interposed between the tooth 412 and the coil 43. Further, the surfaces of the tooth 412 may be coated with insulation instead of the insulator 42.

Figure 2:
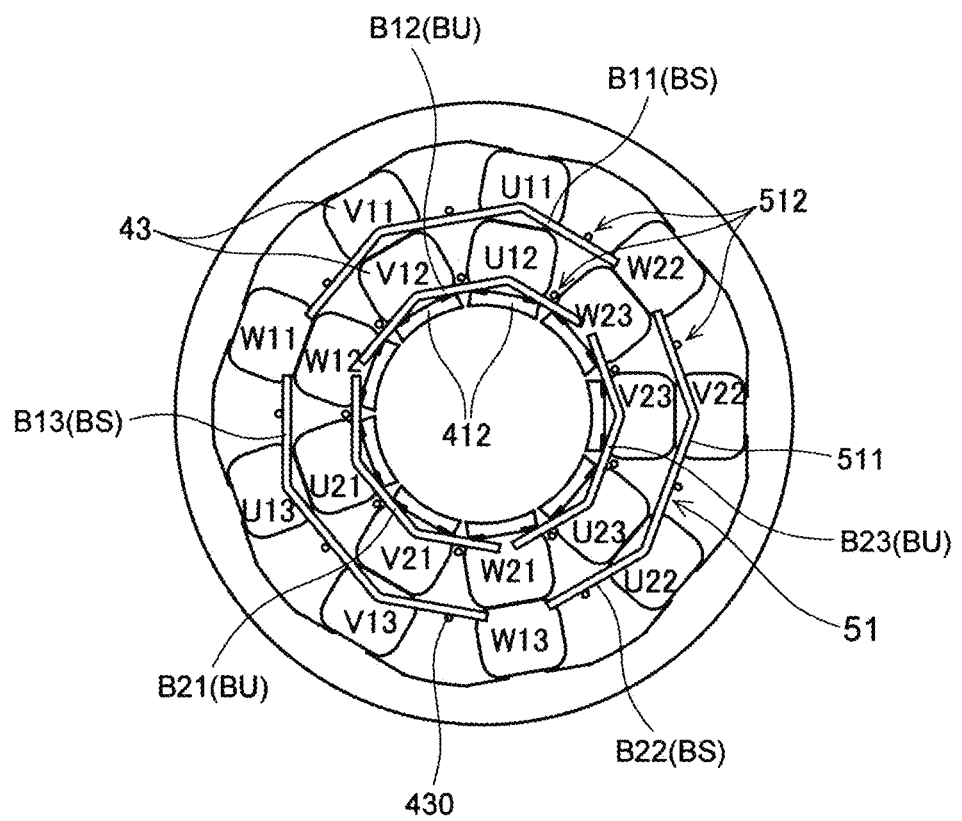
FIG. 2 is a schematic plan view illustrating a positional relationship between coils of a motor and neutral point bus bars according to an example embodiment of the present disclosure.

Further, in the present example embodiment, one pair of coils 43 are disposed around one tooth 412, and the pair of coils 43 are arranged in the radial direction as shown in FIG. 2. Thus, the pair of coils 43 are disposed at each of nine positions in the motor 1 in the circumferential direction. That is, the stator core 41 includes nine teeth 412, and the number of slots of the motor 1 is nine.

Each coil 43 includes two lead wires 430, wherein one lead wire 430 is connected to a neutral point bus bar 51 to be described below, and the other lead wire 430 is connected to a phase bus bar 53 (bus bar) to be described below. The term "lead wire 430" is an end part of the conducting wire constituting the coil 43.

As shown in FIG. 2, eighteen coils 43 include first U-phase coils U11, U12, and U13, first V-phase coils V11, V12, and V13, first W-phase coils W11, W12, and W13, second U-phase coils U21, U22, and U23, second V-phase coils V21, V22, and V23, and second W-phase coils W21, W22, and W23.

In FIG. 2, in a counterclockwise direction, the first U-phase coil U12, the first V-phase coil V12, the first W-phase coil W12, the second U-phase coil U21, the second V-phase coil V21, the second W-phase coil W21, the second U-phase coil U23, the second V-phase coil V23, and the second W-phase coil W23 are arranged in this order on inner end sides of the teeth 412, respectively, in the radial direction.

Further, in FIG. 2, in the counterclockwise direction, the first U-phase coil U11, the first V-phase coil V11, the first W-phase coil W11, the first U-phase coil U13, the first V-phase coil V13, the first W-phase coil W13, the second U-phase coil U22, the second V-phase coil V22, and the second W-phase coil W22 are arranged in this order on outer end sides of the teeth 412, respectively, in the radial direction. Here, the first U-phase coils U11 and U12 are disposed on the same teeth 412.

As shown in FIG. 1, the first bearing 25 and the second bearing 26 are disposed between the housing 21 and a shaft 31 of the rotating part 3. In this manner, the first bearing 25 and the second bearing 26 rotatably support the shaft 31 with respect to the housing 21. In the first bearing 25 and the second bearing 26, a ball bearing is used which relatively rotates an outer ring and an inner ring through a spherical body. Also, other types of bearings such as a sliding bearing or a fluid bearing may be used as the first bearing 25 and the second bearing 26 in place of the ball bearing.

The first bearing 25 is disposed on the other side in the axial direction with respect to the rotor 32 and the coil 43. A first bearing accommodation part 214 configured to accommodate the first bearing 25 is installed on a central portion of the first lid 212. The first bearing accommodation part 214 is a cylindrical-shaped part extending along the central axis C. An outer ring of the first bearing 25 is fixed to an inner circumferential surface of the first bearing accommodation part 214.

The second bearing 26 is disposed on one side in the axial direction with respect to the rotor 32 and the coil 43. A second bearing accommodation part 215 configured to accommodate the second bearing 26 is installed on a central portion of the second lid 213. The second bearing accommodation part 215 is a cylindrical-shaped part extending along the central axis C. An outer ring of the second bearing 26 is fixed to an inner circumferential surface of the second bearing accommodation part 215.

The neutral point bus bar unit 23 includes six neutral point bus bars 51 and a neutral point bus bar holder 52 that is a resin molded product holding the neutral point bus bars 51. The neutral point bus bar 51 is a plate-shaped member, and is formed of, for example, a material having high electrical conductivity such as copper. The lead wires 430 (see FIG. 2) of the plurality of coils 43 are connected to each of the neutral point bus bars 51. That is, the plurality of coils 43 are star-connected and electrically connected to each other through the neutral point bus bar 51.

The six neutral point bus bars 51 include outer bus bars B11, B13, and B22 and inner bus bars B12, B21, and B23. The outer bus bars B11, B13, and B22 are arranged in series in the circumferential direction on an outer circumference end of the neutral point bus bar holder 52. The inner bus bars B12, B21, and B23 are arranged in series in the circumferential direction on inner sides in the radial direction with respect to the outer bus bars B11, B13, and B22. That is, the outer bus bars B11, B13, and B22 are arranged on outer sides in the radial direction with respect to the inner bus bars B12, B21, and B23. Further, in the following description, the outer bus bars B11, B13, and B22 may be collectively referred to as an "outer bus bar BS". In addition, the inner bus bars B12, B21, and B23 may be collectively referred to as an "inner bus bar BU".

As shown in FIG. 2, the first U-phase coil U11, the first V-phase coil V11, and the first W-phase coil W11 arranged on the outer side in the radial direction are connected to the outer bus bar B11 disposed on the outer side in the radial direction. The outer bus bar B11 is disposed in the vicinity of inner ends of the first U-phase coil U11, the first V-phase coil V11, and the first W-phase coil W11 in the radial direction when viewed from the axial direction. The first U-phase coil U12, the first V-phase coil V12, and the first W-phase coil W12 arranged on the inner side in the radial direction are connected to the inner bus bar B12 disposed inward in the radial direction. The inner bus bar B12 is disposed in the vicinity of inner ends of the first U-phase coil U12, the first V-phase coil V12, and the first W-phase coil W12 in the radial direction when viewed from the axial direction.

Further, the first U-phase coil U13, the first V-phase coil V13, and the first W-phase coil W13 arranged on the outer side in the radial direction are connected to the outer bus bar B13 disposed on the outer side in the radial direction. The outer bus bar B13 is disposed in the vicinity of inner ends of the first U-phase coil U13, the first V-phase coil V13, and the first W-phase coil W13 in the radial direction. The second U-phase coil U21, the second V-phase coil V21, and the second W-phase coil W21 arranged on the inner side in the radial direction are connected to the inner bus bar B21 disposed ion the inner side in the radial direction. The inner bus bar B21 is disposed in the vicinity of inner ends of the second U-phase coil U21, the second V-phase coil V21, and the second W-phase coil W21 in the radial direction when viewed from the axial direction.

Further, the second U-phase coil U22, the second V-phase coil V22, and the second W-phase coil W22 arranged on the outer side in the radial direction are connected to the outer bus bar B22 disposed on the outer side in the radial direction. The outer bus bar B22 is disposed in the vicinity of inner ends of the second U-phase coil U22, the second V-phase coil V22, and the second W-phase coil W22 in the radial direction when viewed from the axial direction. The second U-phase coil U23, the second V-phase coil V23, and the second W-phase coil W23 arranged on the inner side in the radial direction are connected to the inner bus bar B23 disposed on the inner side in the radial direction. The inner bus bar B23 is disposed in the vicinity of inner ends of the second U-phase coil U23, the second V-phase coil V23, and the second W-phase coil W23 in the radial direction when viewed from the axial direction.

In the present example embodiment, three neutral point bus bars 51 are arranged on substantially the same position in the radial direction and on different positions in the circumferential direction. Further, the other three neutral point bus bars 51 are arranged on substantially the same position in the radial direction and on different positions in the circumferential direction. By dividing and arranging the neutral point bus bars 51 in the circumferential direction as described above, the work of assembling the neutral point bus bars 51 to the motor 1 is facilitated. Further, the yield of the neutral point bus bar 51 may be improved.

Further, the three neutral point bus bars 51 arranged on substantially the same position in the radial direction have the same shape. In this manner, the manufacturing efficiency of the motor 1 is improved as compared with a case in which shapes of the six neutral point bus bars 51 are all different.

The neutral point bus bar unit 23 is disposed on the other side of the stator 22 in the axial direction and on one side of the first lid 212 in the axial direction. In addition, the neutral point bus bar unit 23 is disposed on an outer side of the first bearing accommodation part 214 in the radial direction. That is, the neutral point bus bar 51 is disposed on a position overlapping the first bearing 25 in the radial direction. An increase in length of the motor 1 in the axial direction may be suppressed by overlapping the first bearing 25 and the neutral point bus bar unit 23 in the radial direction.

The phase bus bar unit 24 includes six phase bus bars 53, a phase bus bar holder 241 (bus bar holder) that is an insulator holding the phase bus bars 53, a phase bus bar cover 242 (bus bar cover) that covers at least one side of each of the phase bus bars 53 in the axial direction, and six connection pins 55. The phase bus bar 53, the phase bus bar holder 241, and the phase bus bar cover 242 are each disposed on one side of the stator 22 in the axial direction and on the other side of the second lid 213 in the axial direction. The phase bus bar holder 241 and the phase bus bar cover 242 are constituted by, for example, a resin molded product. Each of the connection pins 55 passes through the second lid 213 in the axial direction.

The phase bus bar 53 is a plate-shaped member, and is formed of, for example, a material having high electrical conductivity such as copper. The lead wire 430 of at least one coil 43 is connected to each phase bus bar 53. Further, each of the connection pins 55 is electrically connected to an external connection terminal 53d of the phase bus bar 53 on the other side of the second lid 213 in the axial direction. When the motor 1 is being used, each connection pin 55 is electrically connected to an external power supply (not shown) on one side of the second lid 213 in the axial direction, that is, on the outside of the housing 21. When the motor 1 is being driven, a driving current is supplied from the external power supply to the coil 43 through the connection pin 55 and the phase bus bar 53.

In the present example embodiment, the six phase bus bars 53 include a first U-phase bus bar 531, a first V-phase bus bar 532, a first W-phase bus bar 533, a second U-phase bus bar 534, a second V-phase bus bar 535, and a second W-phase bus bar 536. Also, in the following description, the first U-phase bus bar 531, the first V-phase bus bar 532, the first W-phase bus bar 533, the second U-phase bus bar 534, the second V-phase bus bar 535, and the second W-phase bus bar 536 may be collectively referred to as the "phase bus bar 53".

The phase bus bar 53, the phase bus bar holder 241, and the phase bus bar cover 242 are arranged on an outer side of the second bearing accommodation part 215 in the radial direction. That is, the phase bus bar 53, the phase bus bar holder 241, and the phase bus bar cover 242 are arranged at positions overlapping the second bearing 26 in the radial direction. The increase in length of the motor 1 in the axial direction may be further suppressed by overlapping the second bearing 26 and the phase bus bar unit 24 in the radial direction.

Further, hereinafter, the stator 22, the neutral point bus bar unit 23, and the phase bus bar unit 24 are collectively referred to as a "stator unit 20" (see FIG. 11). Further, the more detailed structure of the neutral point bus bar unit 23 and the phase bus bar unit 24 and the electrical connection of the coil 43, the neutral point bus bar 51, and the phase bus bar 53 will be described below.

As shown in FIG. 1, the rotating part 3 includes the shaft 31 and the rotor 32.

The shaft 31 is a columnar member extending along the central axis C. For example, stainless steel is used as a material of the shaft 31. The shaft 31 rotates about the central axis C while being supported by the first bearing 25 and the second bearing 26. An end of the shaft 31 on the other side in the axial direction protrudes to the other side in the axial direction with respect to the first lid 212. An end of the shaft 31 on one side in the axial direction protrudes to one side in the axial direction with respect to the second lid 213. The device to be driven is connected to at least one of the end of the shaft 31 on one side in the axial direction and the end of the shaft 31 on the other side in the axial direction through a power transmission mechanism such as a gear.

As described above, in the present example embodiment, the neutral point bus bar unit 23 and the first bearing 25 are disposed on the positions overlapping each other in the radial direction, and the phase bus bar unit 24 and the second bearing 26 are disposed on the positions overlapping each other in the radial direction. In this manner, the distance between a center of the motor 1 and the end of the shaft 31 may be shortened. Thus, the distance between the center of the motor 1 and the device to be driven in the axial direction may be shortened. In this manner, vibration generated on either one of the motor 1 and the device becomes difficult to be amplified when the vibration is transmitted to the other one. Thus, the vibration in the motor 1 and the device may be suppressed.

The rotor 32 is disposed on an inner side of the stator 22 in the radial direction and rotates with the shaft 31. The rotor 32 includes a rotor core 321 and a plurality of magnets 322.

The rotor core 321 is composed of laminated steel plates in which electromagnetic steel plates are laminated in the axial direction. An insertion hole 320 extending in the axial direction is formed at a center of the rotor core 321. The shaft 31 is disposed in the insertion hole 320 of the rotor core 321. An outer circumferential surface of the shaft 31 and an inner circumferential surface of the rotor core 321 are fixed to each other.

The plurality of magnets 322 are fixed to an outer circumferential surface of the rotor core 321 by, for example, an adhesive. An outer surface of each of the magnets 322 in the radial direction is a magnetic pole surface that faces an inner end surface of the tooth 412 in the radial direction. The plurality of magnets 322 are arranged in the circumferential direction such that an N-pole and an S-pole are alternately arranged. Further, a ring-shaped magnet in which an N-pole and an S-pole are alternately magnetized in the circumferential direction may be used instead of the plurality of magnets 322. Also, the plurality of magnets 322 may be embedded in the rotor core 321.

In the motor 1 configured as described above, when the driving current is applied to the coils 43 from the external power supply (not shown) through the phase bus bars 53, magnetic flux is generated in the plurality of teeth 412 of the stator core 41. In addition, torque in the circumferential direction is generated due to the action of the magnetic flux between the teeth 412 and the magnets 322. Thus, the rotating part 3 rotates about the central axis C with respect to the stationary part 2.

Figure 3:
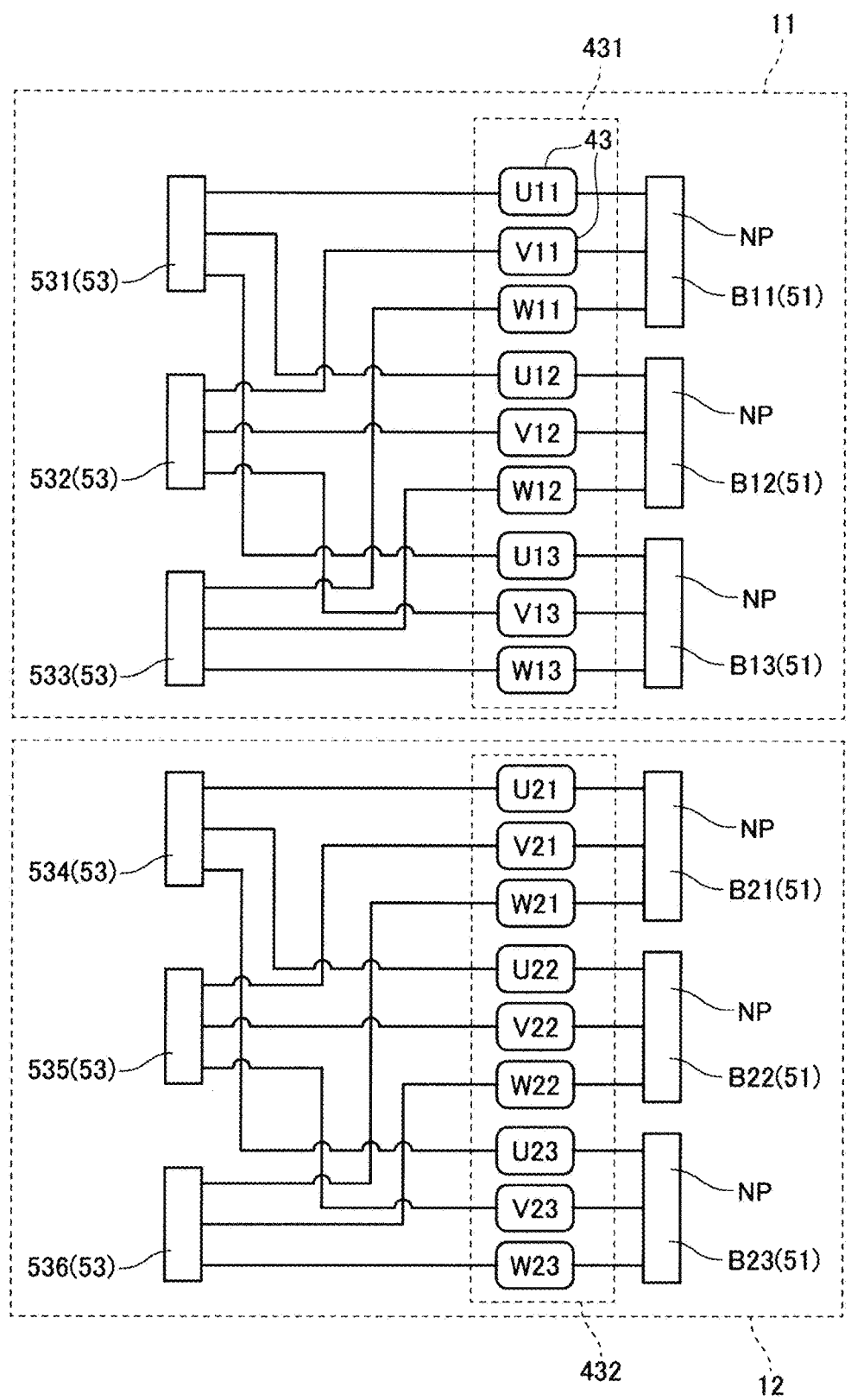
FIG. 3 is a view illustrating a circuit configuration of a motor according to an example embodiment of the present disclosure.

FIG. 3 is a view illustrating a circuit configuration of the motor 1.

The motor 1 includes the eighteen coils 43, the six neutral point bus bars 51, and the six phase bus bars 53. The eighteen coils 43, the six neutral point bus bars 51, and the six phase bus bars 53 are each divided into a first control system 11 and a second control system 12. The first control system 11 and the second control system 12 are independently and separately controlled. That is, the first control system 11 is not electrically connected to the second control system 12.

The eighteen coils 43 are divided into a first coil group 431 belonging to the first control system 11 and a second coil group 432 belonging to the second control system 12. Each of the first coil group 431 and the second coil group 432 includes nine coils 43.

Specifically, the first coil group 431 includes the first U-phase coils U11, U12, and U13, the first V-phase coils V11, V12, and V13, and the first W-phase coils W11, W12, and W13. The second coil group 432 includes the second U-phase coils U21, U22, and U23, the second V-phase coils V21, V22, and V23, and the second W-phase coils W21, W22, and W23.

The outer bus bars B11 and B13 and the inner bus bar B12 belong to the first control system 11. The inner bus bars B21 and B23 and the outer bus bar B22 belong to the second control system 12.

The lead wire 430 of each of the three coils 43 included in the first coil group 431 is connected to each of the outer bus bars B11 and B13 and the inner bus bar B12. Specifically, the lead wire 430 of each of the first U-phase coil U11, the first V-phase coil V11, and the first W-phase coil W11 is connected to the outer bus bar B11. The lead wire 430 of each of the first U-phase coil U12, the first V-phase coil V12, and the first W-phase coil W12 is connected to the inner bus bar B12. The lead wire 430 of each of the first U-phase coil U13, the first V-phase coil V13, and the first W-phase coil W13 is connected to the outer bus bar B13.

The lead wire 430 of each of the three coils 43 included in the second coil group 432 is connected to each of the inner bus bars B21 and B23 and the outer bus bar B22. Specifically, the lead wire 430 of each of the second U-phase coil U21, the second V-phase coil V21, and the second W-phase coil W21 is connected to the inner bus bar B21. The lead wire 430 of each of the second U-phase coil U22, the second V-phase coil V22, and the second W-phase coil W22 is connected to the outer bus bar B22. The lead wire 430 of each of the second U-phase coil U23, the second V-phase coil V23, and the second W-phase coil W23 is connected to the inner bus bar B23.

As described above, each of the first control system 11 and the second control system 12 includes three neutral point bus bars 51. As a result, the number of coils 43 connected to each of the neutral point bus bars 51 may be reduced to three as a minimum number of neutral point NP of a three-phase motor.

The first U-phase bus bar 531, the first V-phase bus bar 532, and the first W-phase bus bar 533 belong to the first control system 11. The second U-phase bus bar 534, the second V-phase bus bar 535, and the second W-phase bus bar 536 belong to the second control system 12.

The lead wire 430 of each of the first U-phase coils U11, U12, and U13 is connected to the first U-phase bus bar 531. The lead wire 430 of each of the first V-phase coils V11, V12, and V13 is connected to the first V-phase bus bar 532. The lead wire 430 of each of the first W-phase coils W11, W12, and W13 is connected to the first W-phase bus bar 533.

The lead wire 430 of each of the second U-phase coils U21, U22, and U23 is connected to the second U-phase bus bar 534. The lead wire 430 of each of the second V-phase coils V21, V22, and V23 is connected to the second V-phase bus bar 535. The lead wire 430 of each of the second W-phase coils W21, W22, and W2 is connected to the second W-phase bus bar 536.

Figure 4:
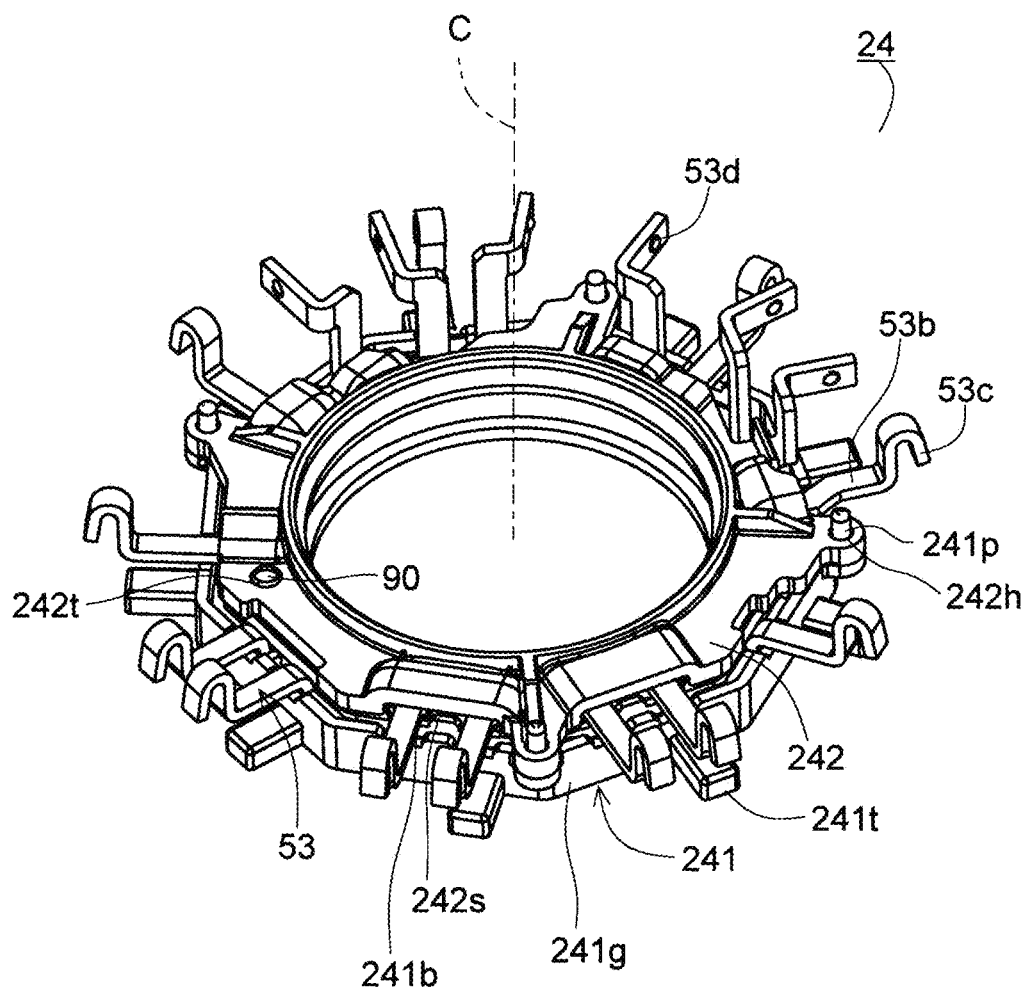
FIG. 4 is a perspective view of a phase bus bar unit of a motor according to an example embodiment of the present disclosure when viewed from one side in an axial direction.
Figure 5:
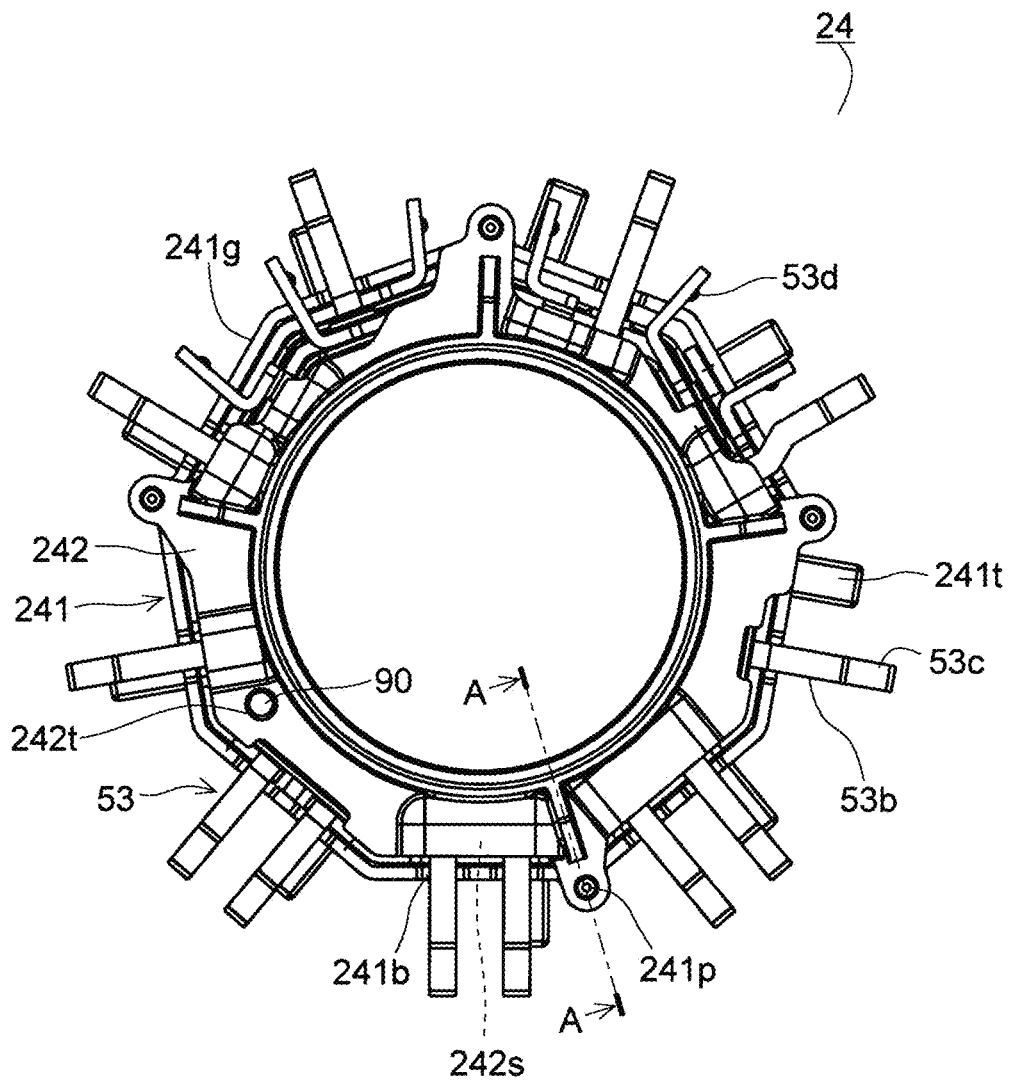
FIG. 5 is a plan view of a phase bus bar unit of a motor according to an example embodiment of the present disclosure when viewed from one side in the axial direction.
Figure 6:
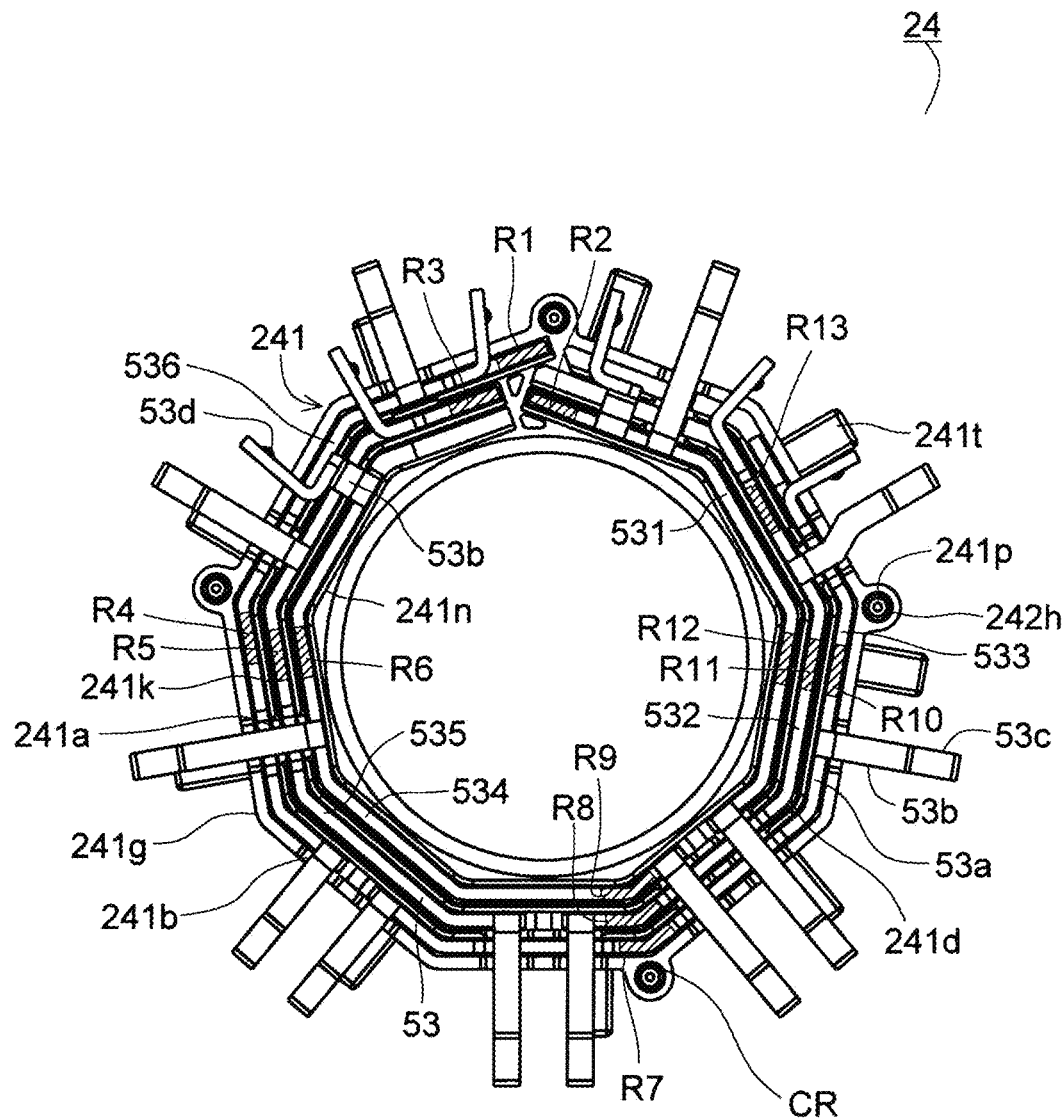
FIG. 6 is a plan view of a phase bus bar unit of a motor according to an example embodiment of the present disclosure from which a phase bus bar cover is removed when viewed from one side in the axial direction.

FIG. 4 is a perspective view of the phase bus bar unit 24 when viewed from one side (lower side in FIG. 1) in the axial direction. FIG. 5 is a plan view of the phase bus bar unit 24 when viewed from one side in the axial direction. FIG. 6 is a plan view of the phase bus bar unit 24 in a state in which the phase bus bar cover 242 is removed when viewed from one side in the axial direction. FIGS. 4 and 5 illustrate a state before the phase bus bar holder 241 and the phase bus bar cover 242 are fixed to each other by thermal welding. In FIG. 4, an upper side corresponds to one side (lower side) in the axial direction in FIG. 1, and a lower side corresponds to the other side (upper side) in the axial direction in FIG. 1. Further, regions R1 to R13 illustrated by hatching in FIG. 6 indicate regions with which protruding parts 242p of the phase bus bar cover 242 come into contact in a base 53a of the phase bus bar 53.

The phase bus bar 53 is a plate-shaped member, and includes the base 53a extending in the circumferential direction about the central axis C, a plurality of extending parts 53b extending outward in the radial direction from the base 53a, a coil connection terminal 53c (terminal) installed on an outer end of each of the extending parts 53b in the radial direction, and the external connection terminal 53d (terminal). The external connection terminal 53d is located on one side in the axial direction with respect to the coil connection terminal 53c. In the present example embodiment, each phase bus bar 53 includes three extending parts 53b, and each of the extending parts 53b includes two coil connection terminals 53c and one external connection terminal 53d. That is, each phase bus bar 53 includes two coil connection terminals 53c and one external connection terminal 53d. Further, although the base 53a extends in the circumferential direction in the present example embodiment, the present disclosure is not limited thereto, and the base 53a may extend in, for example, the direction intersecting the radial direction.

In the phase bus bar holder 241, the first U-phase bus bar 531, the first V-phase bus bar 532, and the first W-phase bus bar 533 are arranged in this order toward the outer side in the radial direction from the central axis C side. In the phase bus bar holder 241, the second U-phase bus bar 534, the second V-phase bus bar 535, and the second W-phase bus bar 536 are arranged in this order toward the outer side in the radial direction from the central axis C side. Further, the first U-phase bus bar 531 and the second U-phase bus bar 534 are adjacent to each other in the circumferential direction. The first V-phase bus bar 532 and the second V-phase bus bar 535 are adjacent to each other in the circumferential direction. The first W-phase bus bar 533 and the second W-phase bus bar 536 are adjacent to each other in the circumferential direction. Further, the arrangement of the phase bus bars 53 is not limited thereto, and may be appropriately changed.

The phase bus bar holder 241 has a polygonal shape of a substantially nonagonal shape in a plan view. The base 53a of the phase bus bar 53 extends along sides of the substantially nonagonal shape (polygonal shape) and is bent inward in the radial direction in the vicinity of a corner portion CR of the substantially nonagonal shape. The extending parts 53b are disposed at portions other than the corner portion CR. Further, the phase bus bar holder 241 may have another polygonal shape (for example, a hexagonal shape or octagonal shape) in a plan view, or may have a shape other than the polygonal shape (for example, a circular shape). In the present example embodiment, since the base 53a of the phase bus bar 53 is bent inward in the radial direction in the vicinity of the corner portion CR, when the phase bus bar holder 241 has a polygonal shape in a plan view, the determination of a position of the phase bus bar 53 in the circumferential direction is facilitated, and thus it is desirable. Further, the "polygonal shape" also includes a substantially polygonal shape.

A partition wall 241k (see FIGS. 6 to 8) configured to separate the phase bus bars 53 adjacent to each other in the radial direction from each other is installed on the phase bus bar holder 241. A groove 241d is formed between an inner circumferential wall 241n and the partition wall 241k, between the partition walls 241k adjacent to each other in the radial direction, and between the partition wall 241k and an outer circumferential wall 241g, and the phase bus bar 53 is accommodated in the groove 241*d*. A short circuit between the phase bus bars 53 adjacent to each other in the radial direction may be prevented by the partition wall 241*k*. Further, an end of the partition wall 241*k* on one side in the axial direction is located on one side in the axial direction with respect to an end of the base 53*a* of the phase bus bar 53 on one side in the axial direction.

A first notch 241*a* notched in the axial direction is formed on the end of the partition wall 241*k* on one side in the axial direction. A portion of the extending part 53*b* extending across the partition wall 241*k* is disposed in the first notch 241*a*. Thus, an increase in length of the phase bus bar unit 24 in the axial direction may be suppressed.

Further, a second notch 241*b* notched in the axial direction is formed on an end of the outer circumferential wall 241*g* of the phase bus bar holder 241 on one side in the axial direction. A portion of the extending part 53*b* extending across the outer circumferential wall 241*g* is disposed in the second notch 241*b*. Thus, the increase in length of the phase bus bar unit 24 in the axial direction may be further suppressed.

The phase bus bar holder 241 includes a plurality of legs 241*t* each protruding outward in the radial direction from the outer circumferential surface. In the present example embodiment, nine legs 241*t* are installed and each disposed on each side of the shape (substantially nonagonal shape) of the phase bus bar holder 241. That is, the plurality of legs 241*t* are disposed on portions other than the corner portion CR. Further, the number of legs 241*t* is not limited to nine, and may be plural.

The insulator 42 of the stator 22 includes an insulator protrusion 421 (see FIG. 1) protruding to one side in the axial direction in the radially outward direction of the coil 43. The plurality of legs 241*t* are fixed to the insulator protrusion 421. The method of fixing the legs 241*t* to the insulator protrusion 421 is not particularly limited, but for example, a thermal welding method may be used.

Further, the phase bus bar holder 241 includes a plurality of protrusions 241*p* each protruding to one side in the axial direction from an outer circumference. In the present example embodiment, four protrusions 241*p* are installed. Further, the number of protrusions 241*p* is not limited to four, and may be plural.

Figure 7:
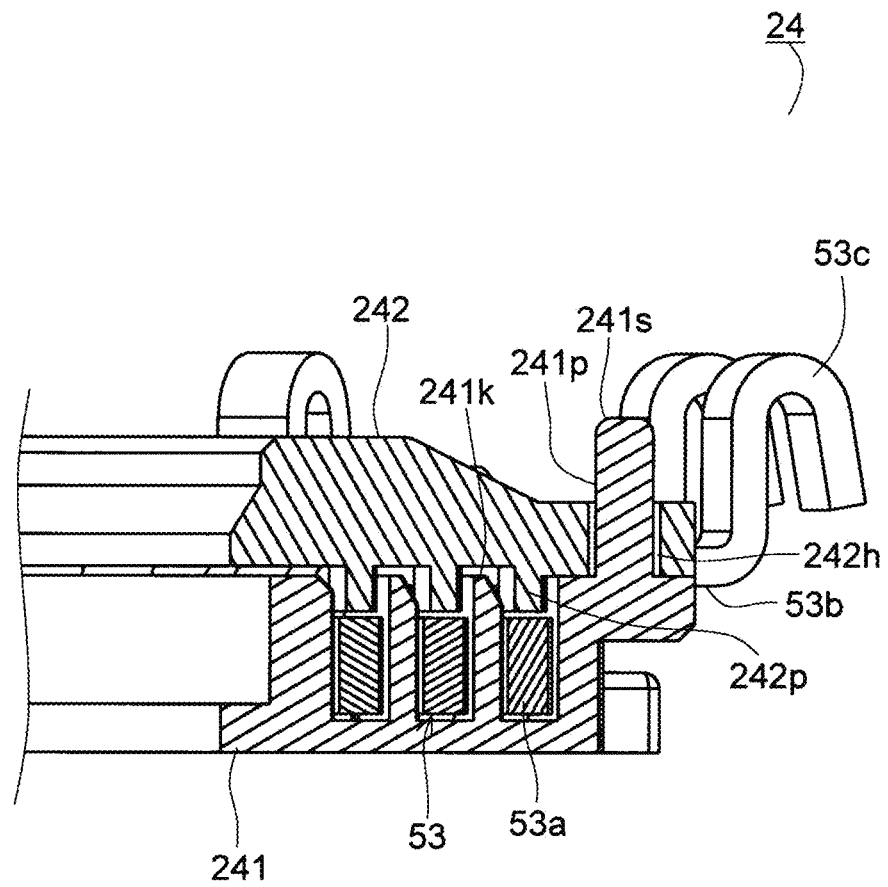
FIG. 7 is a cross-sectional view taken along line A-A of FIG. 5.
Figure 8:
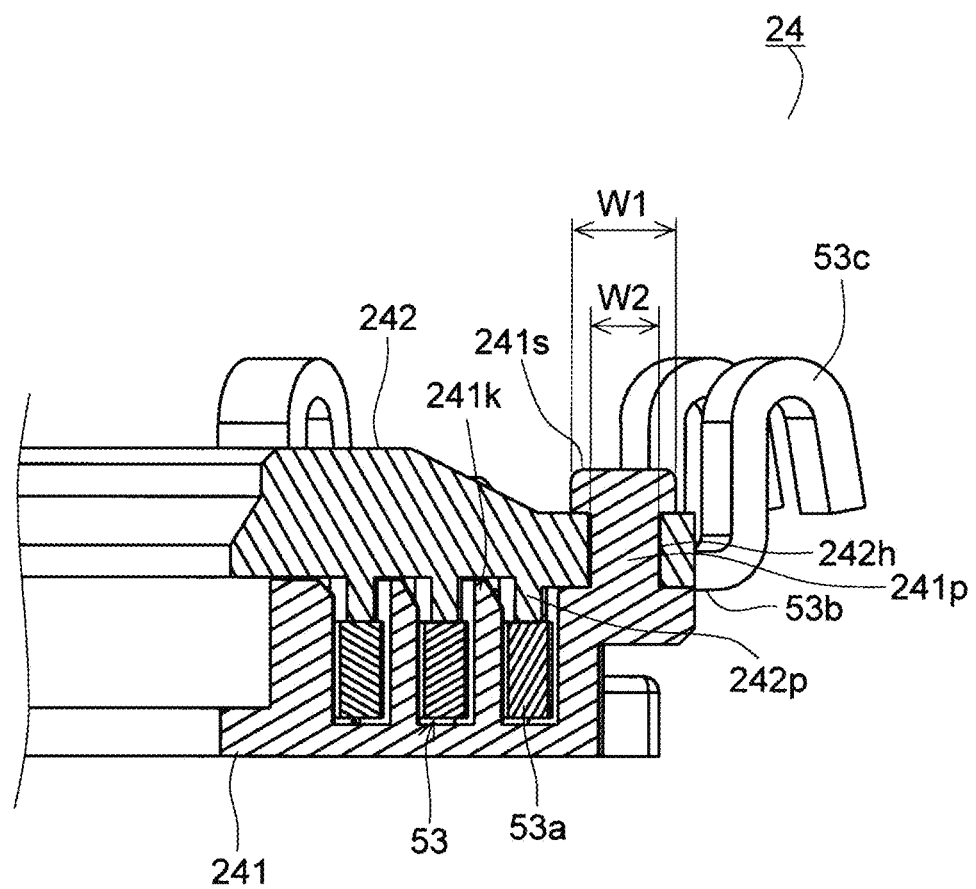
FIG. 8 is a side cross-sectional view illustrating a state after the phase bus bar cover of the phase bus bar unit of the motor according to an example embodiment of the present disclosure is fixed to a phase bus bar holder.
Figure 9:
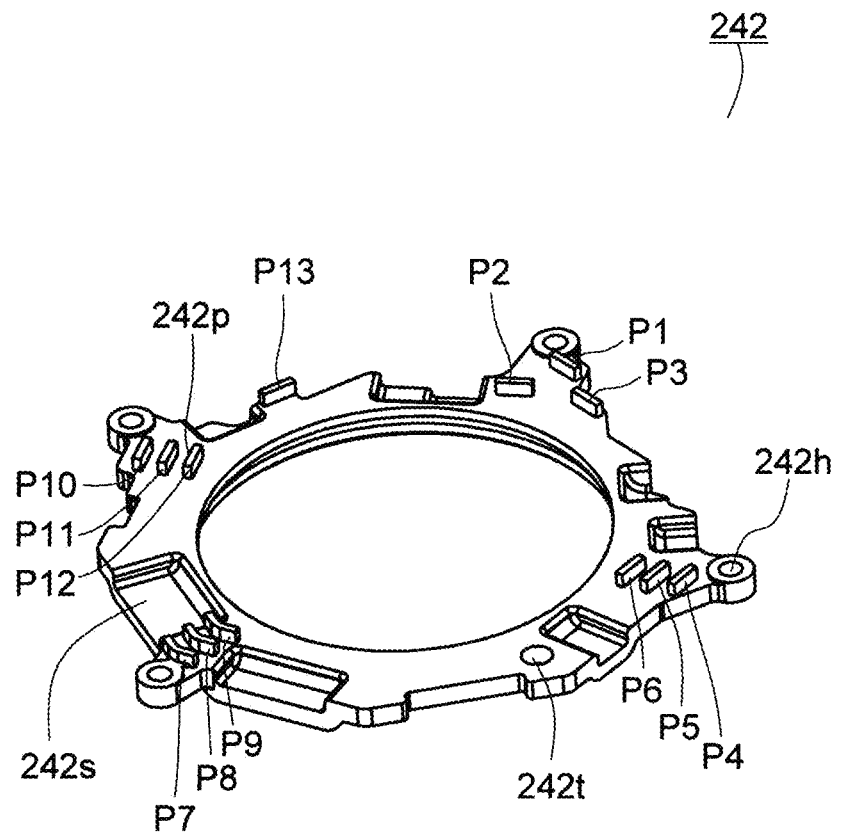
FIG. 9 is a perspective view of the phase bus bar cover of the phase bus bar unit of the motor according to an example embodiment of the present disclosure when viewed from the other side in the axial direction.
Figure 10:
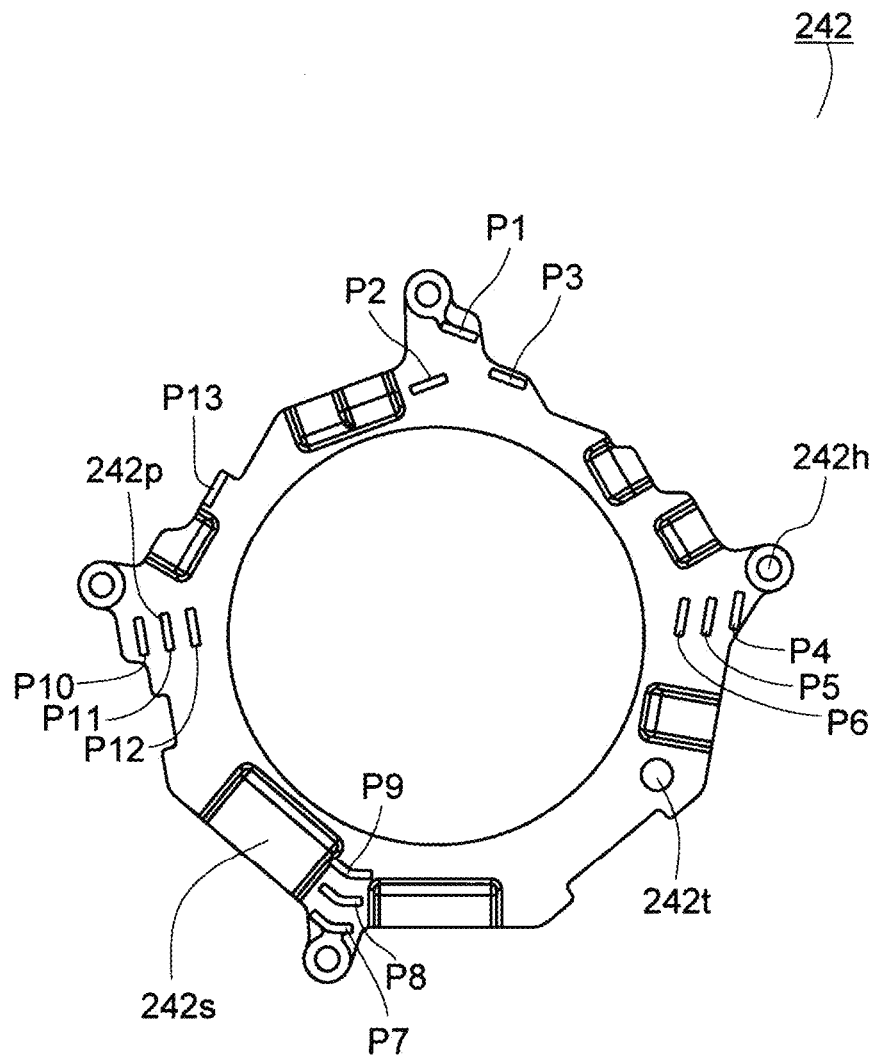
FIG. 10 is a plan view of the phase bus bar cover of the phase bus bar unit of the motor according to an example embodiment of the present disclosure when viewed from the other side in the axial direction.

FIG. 7 is a cross-sectional view taken along line A-A of FIG. 5. FIG. 8 is a cross-sectional view taken along line A-A of FIG. 5 after performing the thermal welding. FIG. 9 is a perspective view of the phase bus bar cover 242 when viewed from a back side (phase bus bar holder 241 side). FIG. 10 is a plan view of the phase bus bar cover 242 when viewed from the back side. In FIG. 9, an upper side corresponds to the other side (upper side) in the axial direction in FIG. 1, and a lower side corresponds to one side (lower side) in the axial direction in FIG. 1.

The phase bus bar cover 242 includes the plurality of protruding parts 242*p* each protruding to the other side in the axial direction. The planar shape of the protruding part 242*p* is a rectangular shape, and a longitudinal direction of the protruding part 242*p* is substantially coincident with the circumferential direction. Further, the "rectangular shape" also includes a substantially rectangular shape. In the present example embodiment, thirteen protruding parts 242*p* are installed. As shown in the regions R1 to R13 of FIG. 6, with respect to each phase bus bar 53, the plurality of protruding parts 242*p* are in contact with the base 53*a*, and one protruding part 242*p* is in contact with the base 53*a* in the vicinity of the extending part 53*b*.

Here, assuming that the thirteen protruding parts 242*p* are protrusions P1 to P13, the regions R1 to R13 in FIG. 6 are regions with which the protrusions P1 to P13 are in contact, respectively. In the present example embodiment, protrusions P1, P2, P3, P5, P6, P8, P9, P10, P11, and P13 are in contact with the base 53*a* in the vicinity of the extending part 53*b*. Further, the term "in the vicinity of the extending part 53*b*" refers that, for example, the distance between the protruding part 242*p* and the extending part 53*b* is within the same length as the length in the longitudinal direction of the protruding part 242*p*. Here, the term "the same length" also includes substantially the same length.

An outer circumference of the phase bus bar cover 242 is formed with a plurality of through holes 242*h* passing therethrough in the axial direction. In the present example embodiment, four through holes 242*h* are arranged in series in the circumferential direction. Also, the number of through holes 242*h* is not limited to four, and may be the same as that of the protrusions 241*p* of the phase bus bar holder 241, or may be four or more.

Next, a method of fixing the phase bus bar holder 241 and the phase bus bar cover 242 will be described. First, the protrusion 241*p* of the phase bus bar holder 241 is inserted through the through hole 242*h* of the phase bus bar cover 242. Subsequently, a front end 241*s* (an end on one side in the axial direction) of the protrusion 241*p* is pressed to the other side (the lower side in FIG. 7) in the axial direction while heating using a thermal welding device (not shown). In this manner, the front end 241*s* of the protrusion 241*p* is deformed such that a width W1 (see FIG. 8) of the front end 241*s* of the protrusion 241*p* becomes greater than a diameter W2 (see FIG. 8) of the through hole 242*h*. Further, the width of the front end 241*s* becomes greater than the width of the root of the protrusion 241*p*. The protrusion 241*p* and the phase bus bar cover 242 are thermal welded by the thermal welding device. Here, the phase bus bar cover 242 is sandwiched by the front end 241*s* and an end surface of the phase bus bar holder 241 on the other side in the axial direction. Thus, the phase bus bar cover 242 is fixed to the phase bus bar holder 241.

It is preferable that the protruding part 242*p* which is in contact with the base 53*a* in the vicinity of the extending part 53*b* be disposed| in the vicinity of the protrusion 241*p* and the through hole 242*h*. Further, the term "in the vicinity of the protrusion 241*p* and the through hole 242*h*" refers that, for example, the distance between the protruding part 242*p*, and the protrusion 241*p* and the through hole 242*h* is within the same length as the length of the protruding part 242*p* in the longitudinal direction. Here, the term "the same length" also includes substantially the same length.

In the base 53*a* of the phase bus bar 53, a portion in the vicinity of the corner portion CR is bent by plastic deformation, and a portion other than the vicinity of the corner portion CR is not bent and is formed in a substantially straight shape. Thus, the positional accuracy of the phase bus bar 53 in the axial direction in the phase bus bar holder 241 is higher in the substantially straight-shaped portion other than the vicinity of the corner portion CR than in the portion in the vicinity of the corner portion CR, which is plastically deformed. Accordingly, it is preferable that the protruding part 242*p* in contact with the base 53*a* in the vicinity of the extending part 53*b* be disposed on the position other than the corner portion CR of the polygonal shape. In this manner, the protruding part 242*p* in contact with the base 53*a* in the vicinity of the extending part 53*b* may be precisely in contact with the base 53*a*.

The phase bus bar cover 242 includes a storage 242s (see FIGS. 4 and 9) swelling on one side in the axial direction. The extending part 53b extending from the base 53a on the inner side in the radial direction and intersecting the base 53a on the outer side in the radial direction is housed in the storage 242s.

Further, the phase bus bar unit 24 includes a temperature sensor 90 (see FIG. 5) configured to detect the temperature of the phase bus bar 53. The phase bus bar cover 242 includes a sensor storage 242t which is a through hole facing the phase bus bar 53. The temperature sensor 90 is disposed in the sensor storage 242t. The sensor storage 242t may be a recess facing the phase bus bar 53 instead of the through hole.

Figure 11:
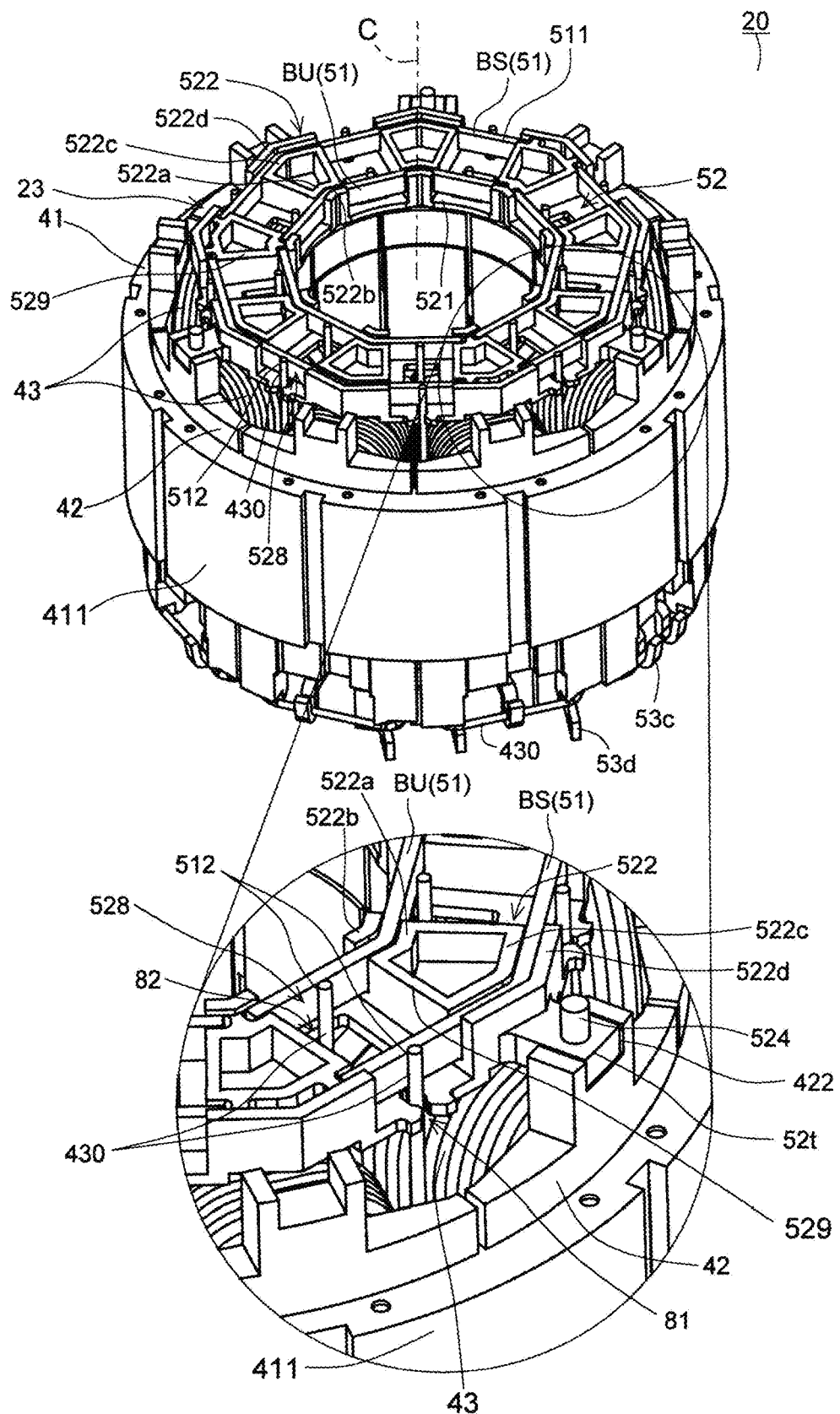
FIG. 11 is a perspective view illustrating a stator and a neutral point bus bar unit of a motor according to an example embodiment of the present disclosure.
Figure 12:
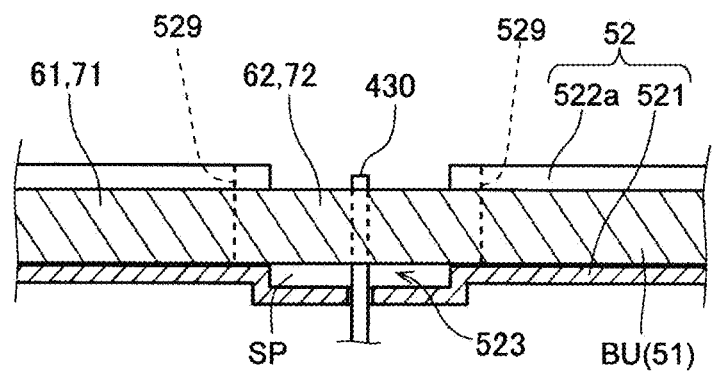
FIG. 12 is a cross-sectional view of a neutral point bus bar unit of a motor according to an example embodiment of the present disclosure taken along a circumferential direction.

FIG. 11 is a perspective view of the stator unit 20 when viewed from the other side in the axial direction. FIG. 12 is a cross-sectional view of the neutral point bus bar unit 23 of the neutral point bus bar 51 (inner bus bar BU) taken along the circumferential direction. In addition, a lower portion of FIG. 11 illustrates an enlarged view of a portion surrounded by a circle in an upper portion of FIG. 11.

Each neutral point bus bar 51 includes three plate-shaped parts 511. The plate-shaped part 511 is a flat plate-shaped part expanding to the axial direction and the circumferential direction. One connection point 512 for connection with the lead wire 430 of the coil 43 is installed on each plate-shaped part 511. By installing the connection point 512 on the plate-shaped part 511 having a plate shape, the welding work may be performed more easily than when the welding is performed on the curved neutral point bus bar.

The planar shape (the shape viewed from the axial direction) of the neutral point bus bar 51 is a portion of a regular nonagonal shape with the central axis C as a center. Further, the number of teeth 412 of the stator core 41 is nine. By arranging the neutral point bus bars 51 along the regular nonagonal shape, it is possible to increase the length of the plate-shaped parts 511 arranged at the same position in the radial direction. Thus, when the number of teeth 412 is N, N plate-shaped parts 511 having a long length in the circumferential direction may be efficiently formed by arranging the neutral point bus bars 51 along a regular N square. Accordingly, the workability at the time of welding of the lead wire 430 of the coil 43 and the neutral point bus bar 51 may be further improved.

In the present example embodiment, the connection point 512 between the lead wire 430 of the coil 43 and the inner bus bar BU is located on an outer side of the inner bus bar BS in the radial direction. Further, the connection point 512 between the lead wire 430 of the coil 43 and the outer bus bar BS is located on an outer side of the outer bus bar BS in the radial direction. Thus, it is preferable to arrange all the connection points 512 on either one of the inner side and the outer side of the neutral point bus bar 51 in the radial direction. In this manner, when welding the lead wire 430 of the coil 43 to the neutral point bus bar 51, all the connection points 512 may be welded without changing the direction of a welding jig. Thus, the productivity of the motor 1 may be improved.

Further, the neutral point bus bar 51 of the present example embodiment is formed by bending two positions of a flat steel plate. For this reason, a force tending to return to a flat shape by a spring back may be generated on the neutral point bus bar 51. When the spring back is occurred, the neutral point bus bar 51 tends to deform toward the outer side in the radial direction by the force due to the spring back.

In the motor 1, the connection point 512 is disposed on the outer side of the neutral point bus bar 51 in the radial direction. For this reason, when the force due to the spring back is generated in the neutral point bus bar 51, the neutral point bus bar 51 moves in a direction toward the lead wire 430 of the coil 43. Thus, a force for pressing the lead wire 430 of the coil 43 and the neutral point bus bar 51 against each other is generated. Thus, when the force due to the spring back is generated in the neutral point bus bar 51, the strength for fixing the lead wire 430 of the coil 43 to the neutral point bus bar 51 may be suppressed from being lowered.

Further, the spring back problem may occur not only when the neutral point bus bar 51 is bent at a plurality of positions as in the present example embodiment, but also when the neutral point bus bar 51 is entirely curved in an arc shape. Thus, it is preferable that the connection point 512 be disposed on the outer side of the neutral point bus bar 51 in the radial direction even when the neutral point bus bar 51 is entirely curved in an arc shape.

The neutral point bus bar holder 52 includes a base part 521 expanding in a direction substantially perpendicular to the central axis C and a holder 522 extending to the other side (upper side in FIG. 11) in the axial direction from the base part 521. The base part 521 expands in an annular shape around the central axis C, and has a polygonal shape of a substantially regular nonagonal shape in a plan view.

The holder 522 includes a first inner support wall 522a, a second inner support wall 522b, a first outer support wall 522c, and a second outer support wall 522d. The first inner support wall 522a supports an outer circumferential surface of the inner bus bar BU. The second inner support wall 522b supports an inner circumferential surface of the inner bus bar BU. The first outer support wall 522c supports an inner circumferential surface of the outer bus bar BS. The second outer support wall 522d supports an outer circumferential surface of the outer bus bar BS.

The inner bus bar BU is sandwiched and held by the first inner support wall 522a and the second inner support wall 522b. The outer bus bar BS is sandwiched and held by the first outer support wall 522c and the second outer support wall 522d. In this manner, the inner bus bar BU and the outer bus bar BS are suppressed from moving in the radial direction with respect to the neutral point bus bar holder 52.

A plurality of openings 528 are formed on both the first inner support wall 522a and the first outer support wall 522c. The plurality of openings 528 are arranged in series in the circumferential direction, and the lead wire 430 of the coil 43 passes therethrough. Further, the opening 528 is provided between the teeth 412 adjacent to each other in the circumferential direction when viewed from the axial direction. In the present example embodiment, the opening 528 is constituted by a notch of the radial direction. The connection point 512 with the coil 43 is formed by the opening 528. Further, the opening 528 may be installed on at least one of the first inner support wall 522a and the first outer support wall 522c.

A connection rib 529 is installed between the openings 528 adjacent to each other in the circumferential direction. The connection rib 529 extends in the radial direction to connect the first inner support wall 522a to the first outer support wall 522c. A plurality of connection ribs 529 are radially arranged about the central axis C. The connection rib 529 connects an edge of the opening 528 of the first inner support wall 522a in the circumferential direction to an edge of the opening 528 of the first outer support wall 522c in the circumferential direction.

A portion of the neutral point bus bar 51 in the circumferential direction is referred to as a held part 61, and the other portion is referred to as an exposed part 62. The held part 61 is a portion in which at least a portion of both side surfaces in the radial direction is covered by the neutral point bus bar holder 52. That is, at least a portion of both side surfaces of the held part 61 in the radial direction is covered by the holder 522. Further, the exposed part 62 is a portion in which both side surfaces in the radial direction are exposed from the neutral point bus bar holder 52. The held part 61 and the exposed part 62 are adjacent to each other in the circumferential direction.

The connection point 512 between the lead wire 430 of the coil 43 and the neutral point bus bar 51 is disposed on the exposed part 62. In this manner, the lead wire 430 of the coil 43 may be connected to the neutral point bus bar 51 even when the neutral point bus bar 51 does not have a terminal protruding in the axial direction or the radial direction. Thus, the motor 1 may be miniaturized without lowering the work efficiency at the time of manufacturing the motor 1.

Further, a portion of the neutral point bus bar 51 in the circumferential direction is referred to as a contact part 71, and the other portion is referred to as a non-contact part 72. The contact part 71 is a portion in which an end surface on one side in the axial direction is in contact with an end surface of the base part 521 of the neutral point bus bar holder 52 on the other side in the axial direction. The non-contact part 72 is a portion in which the end surface on one side in the axial direction faces a space SP (see FIG. 12). Further, at least a portion of the non-contact part 72 overlaps the exposed part 62. The contact part 71 and the non-contact part 72 are adjacent to each other in the circumferential direction.

According to the present example embodiment, a surface of the base part 521 on the other side in the axial direction includes a recess 523 recessed to one side in the axial direction. An end surface of the recess 523 on the one side in the axial direction faces an end surface of the neutral point bus bar 51 on the one side in the axial direction with an interval in the axial direction. That is, the space SP is present between the end surface of the recess 523 on one side in the axial direction and the end surface of the neutral point bus bar 51 on the one side in the axial direction. Thus, in the neutral point bus bar 51, a portion overlapping the recess 523 in the axial direction is the non-contact part 72.

The connection point 512 between the lead wire 430 of the coil 43 and the neutral point bus bar 51 is disposed on the non-contact part 72. In this manner, the lead wire 430 of the coil 43 and the neutral point bus bar 51 may be welded to an end of the neutral point bus bar 51 on one side in the axial direction. That is, the welding area between the lead wire 430 of the coil 43 and the neutral point bus bar 51 may be increased. Thus, the welding conditions are stabilized, and the fixing strength between the lead wire 430 of the coil 43 and the neutral point bus bar 51 may be improved.

In the present example embodiment, the position of the held part 61 coincides with the position of the contact part 71. Further, the position of the exposed part 62 coincides with the position of the non-contact part 72.

An end of the lead wire 430 of the coil 43 on the other side in the axial direction, which is connected to the neutral point bus bar 51, is disposed on the other side in the axial direction with respect to an end of the neutral point bus bar 51 on the other side in the axial direction. In this manner, the lead wire 430 of the coil 43 and the neutral point bus bar 51 may be welded to the end of the neutral point bus bar 51 on the other side in the axial direction. That is, the welding area of the lead wire 430 of the coil 43 and the neutral point bus bar 51 may be further increased. Thus, the welding conditions are stabilized, and the fixing strength between the lead wire 430 of the coil 43 and the neutral point bus bar 51 may be further improved.

As shown in FIG. 11, the base part 521 includes a first coil wire guide part 81 and a second coil wire guide part 82. The first coil wire guide part 81 is a notch notched from an outer end of the base part 521 in the radial direction toward the outer bus bar BS. The lead wire 430 of each of the coils 43, which is connected to each outer bus bar BS, is disposed in the first coil wire guide part 81.

Since the base part 521 includes the first coil wire guide part 81, the lead wire 430 of the coil 43 may be easily disposed in the vicinity of a side surface of the outer bus bar BS when the stator unit 20 is assembled. In this manner, the manufacturing efficiency of the motor 1 may be improved. Further, since the base part 521 includes the first coil wire guide part 81, the positional displacement of the lead wire 430 of the coil 43 may be suppressed when the lead wire 430 of the coil 43 is welded to the outer bus bar BS. Thus, the welding conditions are stabilized, and the fixing strength between the lead wire 430 of the coil 43 and the outer bus bar BS may be improved.

Further, the second coil wire guide part 82 is a through hole passing through in the axial direction. The second coil wire guide part 82 overlaps an outer end of the inner bus bar BU in the radial direction when viewed from the axial direction. Since the base part 521 includes the second coil wire guide part 82, the lead wire 430 of the coil 43 may be easily disposed in the vicinity of a side surface of the inner bus bar BU on the inner side in the radial direction when the stator unit 20 is assembled. Thus, the manufacturing efficiency of the motor 1 may be improved.

Further, the neutral point bus bar holder 52 includes a plurality of attachment parts 52t each protruding outward in the radial direction from an outer circumferential surface of the second outer support wall 522d. The attachment part 52t is fitted into an insulator recess 422 provided in the insulator 42 and thermally welded to the insulator 42. In this manner, the neutral point bus bar unit 23 is fixed to the stator 22.

The attachment part 52t is provided with a holder protrusion 524 protruding to the other side in the axial direction. An end of the holder protrusion 524 on the other side in the axial direction is disposed on the other side in the axial direction with respect to ends of the lead wire 430 of the coil 43 and the neutral point bus bar 51 on the other side in the axial direction. In this manner, the lead wire 430 of the coil 43 does not come into contact with a workbench or the like even when the other side of the stator unit 20 in the axial direction is directed downward and placed on the workbench or the like, Thus, the conducting wire constituting the coil 43 is suppressed from being disconnected, and the lead wire 430 of the coil 43 and the neutral point bus bar 51 in the connection point 512 is suppressed from peeling off.

Further, as shown in FIG. 1, the neutral point bus bar unit 23 is disposed on the other side of the coil 43 in the axial direction, and the phase bus bar unit 24 is disposed on one side of the coil 43 in the axial direction. That is, all the six neutral point bus bars 51 are disposed on the other side of the coil 43 in the axial direction, and all the six phase bus bars 53 are disposed on one side of the coil 43 in the axial direction. Since the neutral point bus bars 51 and the phase bus bars 53 are arranged on the opposite sides with respect to the stator 22 in the axial direction, it is possible to secure a wide area in which the neutral point bus bars 51 are allowed to be laid out. In this manner, the connection point 512 between the lead wire 430 of the coil 43 and the outer bus bar BS and the connection point 512 between the lead wire 430 of the coil 43 and the inner bus bar BU may be disposed to be spaced apart from each other. Thus, the efficiency of the welding work of the lead wire 430 of the coil 43 and the neutral point bus bar 51 is improved.

When welding the lead wire 430 of the coil 43 to the neutral point bus bar 51, the temperature of the neutral point bus bar 51 rises due to the welding heat. In the present example embodiment, the minimum number of lead wires 430 of the coils 43 connected to one neutral point bus bar 51 is three. Thus, the welding work may be performed at an appropriate temperature even at the connection point 512 on which the welding is finally performed among one neutral point bus bar 51. That is, the welding may be performed under stable conditions at all welding points. Further, it is not necessary to interrupt the welding work and wait for the temperature of the neutral point bus bar 51 to be lowered to stabilize the welding conditions, so that the tact time of the welding work may be shortened.

Thus, at the time of manufacturing the stator unit 20, the welding work may be sequentially performed in the circumferential direction on the connection points 512 between the lead wires 430 of the coils 43 and the neutral point bus bars 51, which are arranged at the same position in the radial direction. As a result, the work efficiency of the welding work may be further improved.

As described above, the coil 43 disposed on the inner side in the radial direction is connected to the inner bus bar BU disposed on the inner side in the radial direction, and the coil 43 disposed on the outer side in the radial direction is connected to the outer bus bar BS disposed on the outer side in the radial direction. In the motor 1 having a plurality of systems of coil groups 431 and 432 for redundancy, the number of coils 43 is large. However, the complication of the arrangement of the conducting wires drawn out from the coils 43 may be suppressed by the above-described configuration even in the motor 1 having a large number of coils 43. Further, the term "redundant" motor configuration refers to a configuration capable of continuing the rotation function of the motor even when a fault occurs in some of the functions in the motor.

In the present example embodiment, as shown in FIG. 2, there are the teeth 412 around which only the coils 43 included in the first coil group 431 are disposed, the teeth 412 around which the coils 43 included in the first coil group 431 and the coils 43 included in the second coil group 432 are disposed, and the teeth 412 around which only the coils 43 included in the second coil group 432 are disposed. That is, the arrangement area of the first coil group 431 and the arrangement area of the second coil group 432 are separated. In this manner, when either one of the first control system 11 and the second control system 12 becomes uncontrollable, the coils 43 of the controllable control system are hard to be affected by the uncontrollable control system.

Further, when the temperature detected by the temperature sensor 90 of the phase bus bar unit 24 exceeds a predetermined upper limit temperature, for example, it may be switched from one of the first control system 11 and the second control system 12 to the other one. In this manner, before one of the first control system 11 and the second control system 12 becomes uncontrollable, it may be switched to the other one, and thus it is possible to prevent in advance a case in which one of the first control system 11 and the second control system 12 becomes uncontrollable.

Further, the connection points 512 between the lead wires 430 of the coils 43 and the neutral point bus bars 51 may be distributed not only in the circumferential direction but also in the radial direction by arranging the inner bus bar BU and the outer bus bar BS so as to overlap each other in the radial direction. In the motor 1 having the plurality of systems of coil groups 431 and 432, the number of coils 43 is large to provide redundancy. That is, the number of connection points 512 between the lead wires 430 of the coils 43 and the neutral point bus bars 51 is large. However, the separation distance between the connection points 512 may be increased by the above-described configuration.

Figure 13:
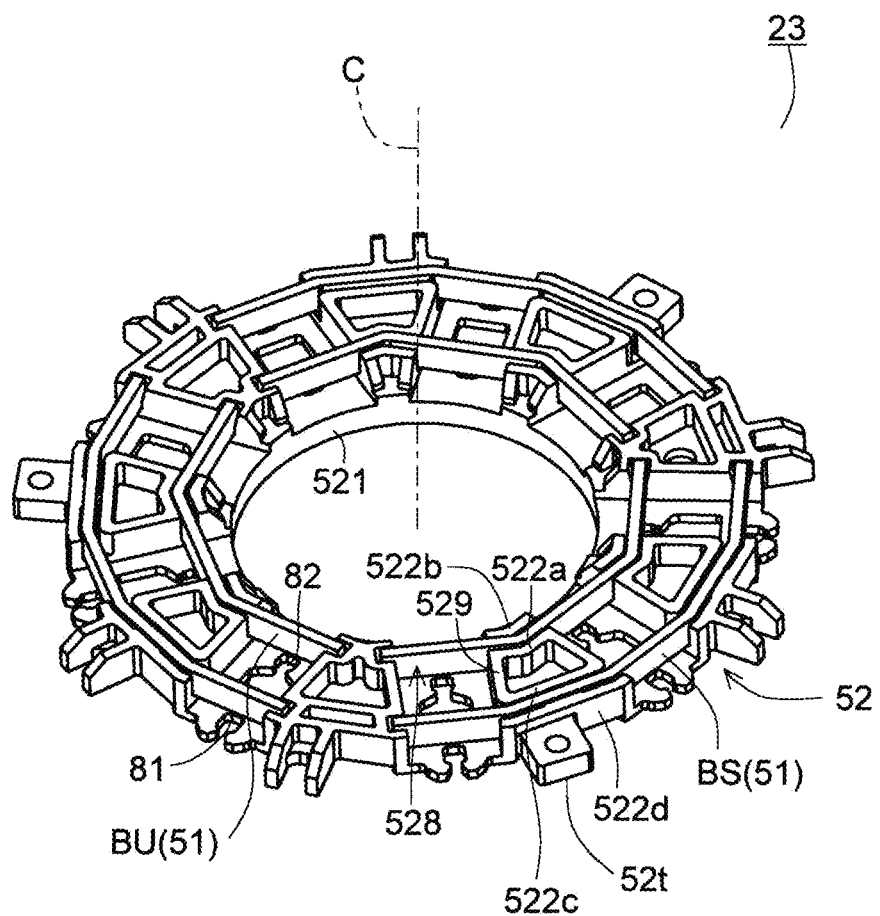
FIG. 13 is a perspective view illustrating a neutral point bus bar unit of a motor according to a modification of an example embodiment of the present disclosure.
Figure 14:
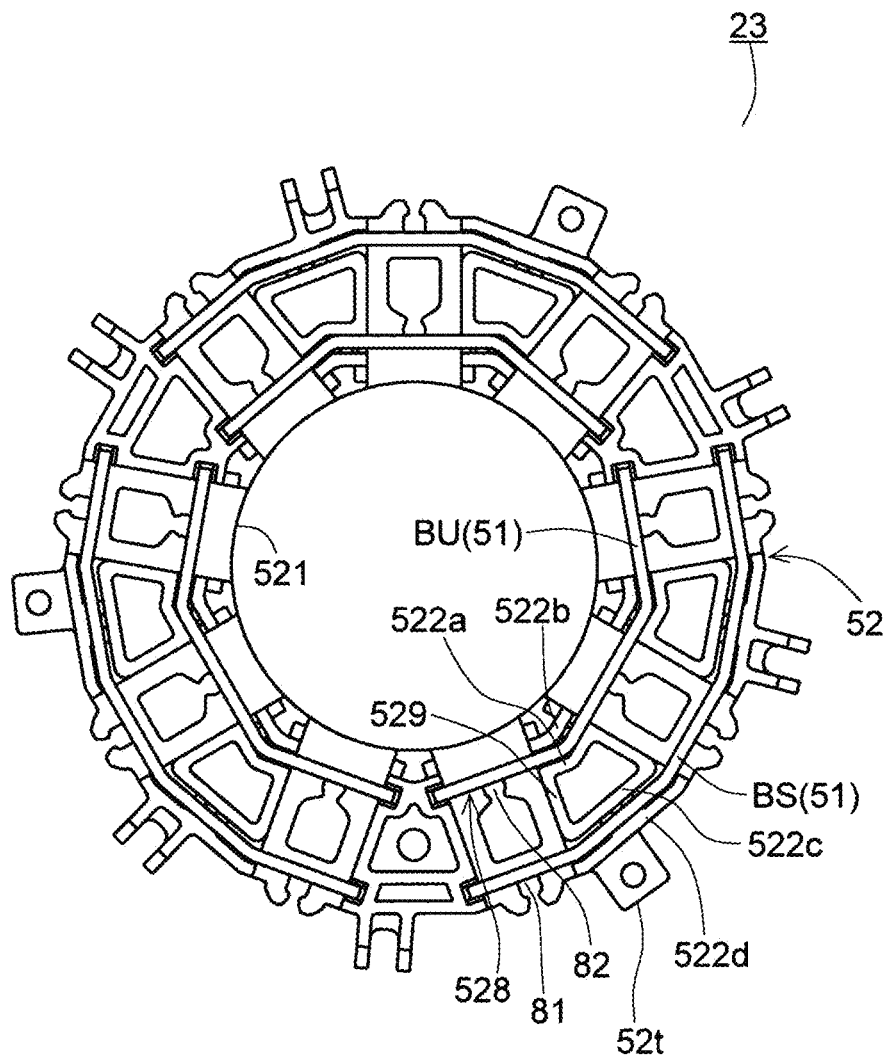
FIG. 14 is a plan view illustrating the neutral point bus bar unit of the motor according to the modification of an example embodiment of the present disclosure.

FIGS. 13 and 14 are a perspective view and a plan view illustrating a neutral point bus bar unit 23 according to a modified example of the present example embodiment, respectively. A neutral point bus bar holder 52 may have a circular shape in a plan view. Further, the term "circular shape" includes a substantially circular shape. Also, a holder protrusion 524 may be omitted from the neutral point bus bar holder 52. Further, a second coil wire guide part 82 may be configured by a notch notched in a radial direction like a first coil wire guide part 81.

Further, an inner bus bar BU may be disposed at a position overlapping an umbrella part 412a of a tooth 412 when viewed from an axial direction, and an outer bus bar BS is disposed on an outer side in the radial direction with respect to coils 43 when viewed from the axial direction. In this manner, the inner bus bar BU and the outer bus bar BS may not overlap the coil 43 in the axial direction, and an increase in length of a motor 1 in the axial direction may be suppressed.

According to the present example embodiment, a phase bus bar unit 24 (bus bar unit) includes a phase bus bar holder 241 (bus bar holder) of an insulator that supports a plurality of phase bus bars 53 (bus bar) of the motor 1 rotating about the central axis C, and a phase bus bar cover 242 (bus bar cover) of an insulator which covers at least one side of each phase bus bar 53 in the axial direction and is fixed to the phase bus bar holder 241. Each phase bus bar 53 includes a base 53a, a plurality of extending parts 53b extending outward in the radial direction from the base 53a, a coil connection terminal 53c (terminal) installed on an outer end of each of the extending parts 53b in the radial direction, and an external connection terminal 53d (terminal). The phase bus bar cover 242 includes a plurality of protruding parts 242p each protruding to the other side in the axial direction, the plurality of protruding parts 242p are brought into contact with each phase bus bar 53, and at least one protruding part 242p is brought into contact with the base 53a in the vicinity of the extending part 53b.

In this manner, the base 53a in the vicinity of the extending part 53b may be sandwiched by the protruding part 242p and the phase bus bar holder 241, so that rattling of the coil connection terminal 53c and the external connection terminal 53d may be prevented. Thus, the electrical connection between the lead wire 430 of the coil 43 and the coil connection terminal 53c and the electrical connection between the external connection terminal 53d and the external wire may be stabilized, thereby improving the reliability of the phase bus bar unit 24.

The base 53a of the plurality of phase bus bars 53 is disposed in series in the radial direction, and the phase bus bar holder 241 is provided with a partition wall 241k that separates the phase bus bars 53 adjacent to each other in the radial direction from each other. A first notch 241a notched in the axial direction is formed on an end of the partition wall 241k on one side in the axial direction. A portion of the extending part 53b extending across the partition wall 241k is disposed in the first notch 241a. In this manner, an increase in length of the phase bus bar unit 24 in the axial direction may be suppressed while preventing a short circuit between the phase bus bars 53 adjacent to each other in the radial direction by the partition wall 241$k$.

A second notch 241$b$ notched in the axial direction is formed on an end of an outer circumferential wall 241$g$ of the phase bus bar holder 241 on one side in the axial direction. A portion of the extending part 53$b$ extending across the outer circumferential wall 241$g$ is disposed in the second notch 241$b$. Thus, the increase in length of the phase bus bar unit 24 in the axial direction may be further suppressed.

The end of the partition wall 241$k$ on one side in the axial direction is located on one side in the axial direction with respect to an end of the base 53$a$ on one side in the axial direction. In this manner, the creepage distance between the phase bus bars 53 adjacent to each other in the radial direction may be increased. Accordingly, a short circuit between the phase bus bars 53 adjacent to each other in the radial direction may be easily prevented while suppressing the increase in length of the phase bus bar unit 24 in the radial direction.

The phase bus bar cover 242 includes a storage 242$s$ swelling on one side in the axial direction. The extending part 53$b$ extending from an inner side of the base 53$a$ in the radial direction and intersecting the base 53$a$ on an outer side of in the radial direction is housed in the storage 242$s$. In this manner, the interference between the phase bus bar cover 242 and the extending part 53$b$ intersecting the base 53$a$ of the phase bus bar 53 on the outer side in the radial direction may be prevented.

The phase bus bar unit 24 further includes a temperature sensor 90 configured to detect the temperature of the phase bus bar 53. The phase bus bar cover 242 includes a sensor storage 242$t$ that is a recess or through hole facing the phase bus bar 53, and the temperature sensor 90 is disposed in the sensor storage 242$t$. Thus, the temperature of the phase bus bar 53 may be easily detected by the temperature sensor 90, and the motor 1 may be controlled on the basis of, for example, the detection result of the temperature sensor 90. Further, the temperature sensor 90 may be easily attached to the phase bus bar unit 24.

The phase bus bar cover 242 and the phase bus bar holder 241 are resin molded products. The phase bus bar holder 241 includes a protrusion 241$p$ having a front end 241$s$ whose width is greater than that of the root, and the phase bus bar cover 242 includes a through hole 242$h$ through which the protrusion 241$p$ is inserted. A width W1 of the front end 241$s$ of the protrusion 241$p$ is greater than a diameter W2 of the through hole 242$h$. Thus, the phase bus bar cover 242 may be easily fixed to the phase bus bar holder 241. Further, the phase bus bar holder 241 may include the through hole 242$h$, and the phase bus bar cover 242 may include the protrusion 241$p$. That is, either one of the phase bus bar cover 242 and the phase bus bar holder 241 may include the protrusion 241$p$, and the other one of the phase bus bar cover 242 and the phase bus bar holder 241 may include the through hole 242$h$.

It is preferable that the protruding part 242$p$, which is in contact with the base 53$a$ in the vicinity of the extending part 53$b$, be disposed in the vicinity of the protrusion 241$p$ and the through hole 242$h$. In this manner, when fixing the protrusion 241$p$, which is inserted through the through hole 242$h$, to the phase bus bar cover 242, the dimensional accuracy of the protruding part 242$p$, which is in contact with the base 53$a$ in the vicinity of the extending part 53$b$, and the base 53$a$ is stabilized. Thus, the protruding part 242$p$ may be stably contacted by the base 53$a$ in the vicinity of the extending part 53$b$.

The phase bus bar holder 241 may have a polygonal shape in a plan view, the protrusion 241$p$ or the through hole 242$h$ may be disposed on a corner portion CR of the polygonal shape, and the extending part 53$b$ may be disposed on a portion other than the corner portion CR. Thus, when fixing the phase bus bar cover 242 and the phase bus bar holder 241 on the protrusion 241$p$ and the through hole 242$h$ by performing, for example, thermal welding, the thermal deformation and the like of a portion on which the extending part 53$b$ is disposed may be reduced in the phase bus bar holder 241. Accordingly, the positional accuracy of the extending part 53$b$ in the phase bus bar holder 241 may be improved, and the connection between the coil connection terminal 53$c$ and the lead wire 430 and the connection between the external connection terminal 53$d$ and the external wire may be further stabilized.

The phase bus bar holder 241 has a polygonal shape in a plan view. Thus, positioning of the phase bus bar 53 in the circumferential direction may be facilitated.

In the base 53$a$ of the phase bus bar 53, a portion in the vicinity of the corner portion CR is bent by plastic deformation, and a portion other than the vicinity of the corner portion CR is not bent and is formed in a substantially straight shape. Thus, the positional accuracy of the phase bus bar 53 in the axial direction in the phase bus bar holder 241 is higher in the substantially straight-shaped portion other than the vicinity of the corner portion CR than in the portion in the vicinity of the corner portion CR, which is plastically deformed. Accordingly, it is preferable that the protruding part 242$p$ in contact with the base 53$a$ in the vicinity of the extending part 53$b$ be disposed on the position other than the corner portion CR of the polygonal shape. In this manner, the protruding part 242$p$ in contact with the base 53$a$ in the vicinity of the extending part 53$b$ may be precisely in contact with the base 53$a$.

The motor 1 includes the phase bus bar unit 24, the stator 22, and a rotor 32 having a magnet 322 facing the stator 22 in the radial direction and rotating about the central axis C. In this manner, the motor 1 may be easily realized which is provided with the phase bus bar unit 24 capable of improving the reliability.

The phase bus bar holder 241 includes a plurality of legs 241$t$ each protruding outward in the radial direction from an outer circumferential surface, and the plurality of legs 241$t$ are fixed on the stator 22. Thus, the phase bus bar unit 24 may be easily attached to the stator 22.

Further, in the neutral point bus bar unit 23, the inner bus bar BU and the outer bus bar BS, which extend in the circumferential direction with respect to the central axis C of the motor 1 and are connected to the coil 43 of the stator 22, are held by the neutral point bus bar holder 52 of a resin molded product, and the outer bus bar BS is disposed on the outer side in the radial direction with respect to the inner bus bar BU. The neutral point bus bar holder 52 includes a first inner support wall 522$a$ supporting an outer circumferential surface of the inner bus bar BU, and a first outer support wall 522$c$ supporting an inner circumferential surface of the outer bus bar BS. Further, the neutral point bus bar holder 52 includes a plurality of openings 528 which are open in at least one of the first inner support wall 522$a$ and the first outer support wall 522$c$ in parallel in the circumferential direction and through which lead wires 430 of the coils 43 pass, and a connection rib 529 extending in the radial direction between the openings 528 adjacent to each other in the circumferential direction and connecting the first inner support wall 522a to the first outer support wall 522c.

The rigidity of the neutral point bus bar holder 52 may be improved without increasing the length in the axial direction by the connection rib 529. Further, when the neutral point bus bar holder 52 is molded, a resin of the first inner support wall 522a is connected to a resin of the first outer support wall 522c through a resin of the connection rib 529. Thus, the resin may be filled in a mold while preventing the resin from flowing around on an outer circumferential side of the first inner support wall 522a and an inner circumferential side of the first outer support wall 522c, and the flow of hot water at the time of molding the neutral point bus bar holder 52 may be improved. In addition, the resin of the first inner support wall 522a and the resin of the first outer support wall 522c after being filled in the mold are cooled to substantially the same degree through the resin of the connection rib 529, so that the generation of sink marks and the like may be suppressed. Thus, the deformation of the neutral point bus bar holder 52 may be reduced, thereby improving the positional accuracy of the neutral point bus bar 51. As a result, the connection accuracy between the lead wire 430 of the coil 43 and the neutral point bus bar 51 may be improved, thereby improving the reliability of the neutral point bus bar unit 23.

The neutral point bus bar holder 52 includes a second inner support wall 522b supporting an inner circumferential surface of the inner bus bar BU, and a second outer support wall 522d supporting the outer circumferential surface of the outer bus bar BS. The inner bus bar BU is sandwiched and held by the first inner support wall 522a and the second inner support wall 522b, and the outer bus bar BS is sandwiched and held by the first outer support wall 522c and the second outer support wall 522d. Thus, the inner bus bar BU and the outer bus bar BS may be easily held.

The openings 528 are provided in the first inner support wall 522a and the first outer support wall 522c. In this manner, the workability at the time of welding the lead wire 430 of the coil 43 to the inner bus bar BU and the outer bus bar BS may be improved.

The connection rib 529 connects an edge of the opening 528 of the first inner support wall 522a in the circumferential direction to an edge of the opening 528 of the first outer support wall 522c in the circumferential direction. In this manner, the first inner support wall 522a and the first outer support wall 522c may be easily reinforced even when the opening 528 is provided.

The opening 528 is constituted by a notch in the radial direction. Thus, the opening 528 may be easily realized.

The plurality of connection ribs 529 are radially arranged about the central axis C. Thus, the rigidity of the neutral point bus bar holder 52 may be further improved.

The motor 1 includes the neutral point bus bar unit 23, the stator 22, and the rotor 32 having the magnet 322 disposed to face an inner side of the stator 22 in the radial direction and rotating about the central axis C. The stator 22 includes a core back 411 having an annular shape, a plurality of teeth 412 each extending inward in the radial direction from an inner circumferential surface of the core back 411 and arranged in series in the circumferential direction, and a coil 43 wound around each tooth 412. Thus, the motor 1 capable of improving the rigidity of the neutral point bus bar holder 52 and improving the positional accuracy of the neutral point bus bar 51 may be easily realized.

The opening 528 is provided between the teeth 412 adjacent to each other in the circumferential direction when viewed from the axial direction. In this manner, a space between the adjacent teeth 412 may be effectively used to easily suppress the increase in length of the motor 1 in the axial direction.

The plurality of coils 43 are star-connected to configure a plurality of neutral points NP, and the neutral point NP is constituted by the inner bus bar BU and the outer bus bar BS. Thus, the motor 1 may be easily realized which is provided with the neutral point bus bar unit 23 having the neutral point NP on the inner side in the radial direction and the outer side in the radial direction.

Each of the teeth 412 includes an umbrella part 412a protruding in the circumferential direction from an inner end in the radial direction. It is preferable that the inner bus bar BU be disposed at a position overlapping the umbrella part 412a when viewed from the axial direction, and the outer bus bar BS be disposed on the outer side in the radial direction with respect to the coil 43 when viewed from the axial direction. In this manner, the increase in length of the motor 1 in the axial direction may be further suppressed.

The plurality of coils 43 includes a first coil group 431 having a plurality of coils 43 belonging to a first control system 11 and a second coil group 432 having a plurality of coils 43 belonging to a second control system 12 independent of the first control system 11. In this manner, even when a failure occurs in a portion of one of the first control system 11 and the second control system 12, the rotation of the motor 1 may be continued using the other one.

The number of teeth 412 is preferably nine. Thus, it is possible to easily realize a 9-slot motor 1 provided with the neutral point bus bar unit 23.

Further, in the present example embodiment, the number of teeth 412 is nine, and the number of coils 43 is eighteen. That is, the number of slots is nine, and the number of control systems is two. However, the present disclosure is not limited thereto. The number of slots is not limited to nine, and for example, may be six or twelve. Further, the number of control systems may be three or more.

Further, in the present example embodiment, two coils are arranged around one tooth 412. However, the present disclosure is not limited thereto. One coil may be disposed around one tooth, or three or more coils may be arranged around one tooth. Further, in the present example embodiment, two coils 43 are arranged on one tooth 412 in series in the radial direction, but the present disclosure is not limited thereto. Two coils 43 may be arranged to overlap the same position of one tooth 412 in the radial direction. Further, the coil 43 may be bifilar wound.

Further, in the present example embodiment, the first control system 11 and the second control system 12 are separately controlled, but the present disclosure is not limited thereto. The first control system 11 and the second control system 12 may be controlled in conjunction with each other by a single controller. However, even in that case, in the motor 1, the coil, the neutral point bus bar, and the phase bus bar belonging to the first control system 11 are not electrically connected to the coil, the neutral point bus bar, and the phase bus bar belonging to the second control system 12.

Further, the motor 1 of the present example embodiment is an inner-rotor-type motor, but the present disclosure may be applied to an outer-rotor-type motor.

Further, the detailed shape of each member may be different from the shape shown in each drawing of the present specification. Further, the elements described above may be appropriately combined within a range where inconsistency does not occur.

The present disclosure may be used for a phase bus bar unit (bus bar unit) and a motor including the same.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A bus bar unit comprising:
a bus bar holder, which is made of an insulating material and houses bus bars of phases of a motor rotating about a central axis; and
a bus bar cover, which is made of an insulating material, covers at least one side of each of the bus bars in an axial direction, and is fixed to the bus bar holder; wherein
each of the bus bars includes a base, extensions each extending outward in a radial direction from the base, and a terminal installed on an outer end of each of the extensions in the radial direction;
the bus bar cover includes protrusions each protruding to another side in the axial direction;
the protrusions are in contact with each of the bus bars while at least one of the protrusions is in contact with the base at or adjacent to the extensions;
the bus bar holder includes protruding portions each protruding in the axial direction and each including a front end with a width that is greater than that of a root, and the bus bar cover includes through holes through which each of the protruding portions is inserted in the axial direction;
the width of the front ends is greater than a diameter of the through holes;
the protruding portions are all positioned outward from the protrusions in the radial direction; and
at least on of the protruding portions radially overlaps with one of the protrusions when viewed from the axial direction.

2. The bus bar unit of claim 1, wherein
the bases of the bud bars are arranged in series in the radial direction;
the bus bar holder is provided with a partition wall to separate the bus bars adjacent to each other in the radial direction from each other;
a first notch notched in the axial direction is provided on an end of one side of the partition wall in the axial direction; and
a portion of the extension extending across the partition wall is disposed in the first notch.

3. The bus bar unit of claim 2, wherein
a second notch notched in the axial direction is provided on an end of one side of an outer circumferential wall of the bus bar holder in the axial direction; and
a portion of the extension extending across the outer circumferential wall is disposed in the second notch.

4. The bus bar unit of claim 2, wherein the end of the one side of the partition wall in the axial direction is located on one side in the axial direction with respect to an end of one side of the base in the axial direction.

5. The bus bar unit of claim 2, wherein
the bus bar cover includes a storage swelling on one side in the axial direction; and
the storage swelling accommodates the extension that extends from the base in an inner side in the radial direction and intersects the base in an outer side in the radial direction.

6. The bus bar unit of claim 1, further comprising a temperature sensor to detect a temperature of the bus bar; wherein
the bus bar cover includes a sensor storage which is a recess or through hole facing the bus bar; and
the temperature sensor is disposed in the sensor storage.

7. The bus bar unit of claim 1, wherein the protrusion in contact with the base at or adjacent to the extension is disposed at or adjacent to the at least one of the protruding portions and the through hole.

8. The bus bar unit of claim 1, wherein
the bus bar holder has a polygonal shape in a plan view;
the at least one of the protruding portions or the through hole is disposed on a corner portion of the polygonal shape; and
the extension is disposed on a portion other than the corner portion.

9. The bus bar unit of claim 1, wherein the bus bar holder has a polygonal shape in a plan view.

10. The bus bar unit of claim 9, wherein the protrusion in contact with the base at or adjacent to the extension is located at a position other than the corner portion of the polygonal shape.

11. A motor comprising:
the bus bar unit of claim 1;
a stator; and
a rotor including a magnet facing the stator in a radial direction and rotatable about the central axis.

12. The motor of claim 11, wherein the bus bar holder includes legs each protruding outward in the radial direction from an outer circumferential surface, and the legs are fixed on the stator.

13. The motor of claim 12, wherein
the terminal contacts a lead wire of a coil;
the protruding portion, the legs, and the terminal are arranged in this order from a central axis side along the radial direction; and
the protruding portions are arranged different position in a circumferential direction from the legs and the terminal.

14. A motor comprising:
a stator;
a rotor including a magnet opposing the stator in a radial direction and rotatable about the central axis; and
a bus bar unit including:
a bus bar holder, which is made of an insulating material and houses bus bars of phases of a motor rotating about a central axis; and
a bus bar cover, which is made of an insulating material, covers at least one side of each of the bus bars in an axial direction, and is fixed to the bus bar holder; wherein
each of the bus bars includes a base, extensions each extending outward in a radial direction from the base, and a terminal installed on an outer end of each of the extensions in the radial direction and contacting a lead wire of a coil;
the bus bar cover includes protrusions each protruding to another side in the axial direction;
the bus bar holder includes protruding portions each protruding in the axial direction and each including a front end with a width that is greater than that of a root, and the bus bar cover includes through holes through which each of the protruding portions is inserted in the axial direction;

the width of the front ends is greater than a diameter of the through holes;

the bus bar holder includes legs each protruding outward in the radial direction from an outer circumferential surface of the bus bar holder, and the legs being fixed on the stator;

the protruding portion, the legs, and the terminal are arranged in this order from a central axis side along the radial direction; and the protruding portions are arranged different position in a circumferential direction from the legs and the terminal.

* * * * *